United States Patent
Wood et al.

(10) Patent No.: US 7,053,975 B2
(45) Date of Patent: May 30, 2006

(54) LIQUID CRYSTAL DEVICE

(75) Inventors: Emma L Wood, Malvern (GB); Guy P Bryan-Brown, Malvern (GB); Victor C Hui, Malvern (GB); John C Jones, Malvern (GB); Carl V Brown, Nottingham (GB)

(73) Assignee: ZBD Displays Limited, Malvern (GB)

( * ) Notice: Subject to any disclaimer, the term of this patent is extended or adjusted under 35 U.S.C. 154(b) by 142 days.

(21) Appl. No.: 10/333,472

(22) PCT Filed: Jul. 18, 2001

(86) PCT No.: PCT/GB01/03168

§ 371 (c)(1),
(2), (4) Date: Oct. 16, 2003

(87) PCT Pub. No.: WO02/08825

PCT Pub. Date: Jan. 31, 2002

(65) Prior Publication Data
US 2004/0191427 A1    Sep. 30, 2004

(30) Foreign Application Priority Data
Jul. 21, 2000   (GB)   .................................. 00179531

(51) Int. Cl.
*G02F 1/13*   (2006.01)
*G02F 1/1337*  (2006.01)

(52) U.S. Cl. ....................... 349/177; 349/130

(58) Field of Classification Search ................ 349/177, 349/123, 128, 136, 130
See application file for complete search history.

(56) References Cited

U.S. PATENT DOCUMENTS

| 4,333,708 A   | * | 6/1982 | Boyd et al. ................ 349/129 |
| 4,472,026 A   | * | 9/1984 | Boyd et al. ................ 349/21 |
| 5,438,421 A   |   | 8/1995 | Sugawara et al. |
| 6,452,573 B1  | * | 9/2002 | Martinot-Lagarde et al. .. 345/8 |
| 2001/0012080 A1 | * | 8/2001 | Barberi et al. ............. 349/123 |
| 2004/0263735 A1 | * | 12/2004 | Kitson et al. .............. 349/123 |

FOREIGN PATENT DOCUMENTS
JP        5-88177       4/1993
WO        WO 99/34251   8/1999

OTHER PUBLICATIONS

Barberi et al "Azimuthal Anchoring of nematic on undulated substrate Elasticity VS Memory", Eur. Phys JB 6, 83-91.*
Bryan-Brown et al, "5.3: Grating Aligned Bistable Nematic Device" SID 97 Digest 1997, pp. 37-40.

(Continued)

Primary Examiner—Kenneth Parker
(74) *Attorney, Agent, or Firm*—Nixon & Vanderhye P.C.

(57) ABSTRACT

Liquid crystal devices are described that exhibit bistable, tri-stable or other multistable operation. The stable liquid crystal configurations are attained using a surface alignment grating (144) on the internal surface of at least one cell wall (142). The surface profile of the surface alignment grating comprises three or more defect sites per grating period and permit the liquid crystal molecules to adopt any one of two or more stable pretilt angles in the same azimuthal plane. Application of a suitable voltage causes the liquid crystal material to switch between the stable configurations.

29 Claims, 17 Drawing Sheets

OTHER PUBLICATIONS

Yamamoto et al, "Pretilt-angle Control of Liquid-Crystal Alignment by using Projections on Substrate Surfaces for Dual-Doman TN-LCD" *Journal of the SID*, 4/2, 1996, pp. 83-87.

Wilson et al, "Alignment of Liquid Crystals on Surfaces With Films Deposited Obliquely at Low and High Rates" *Molecular Crystals and Liquid Crystals*, vol. 94, 1983, pp. 359-366.

Thurston et al, "Mechanically Bistable Liquid-Crystal Display Structures" *IEEE Transactions on Electron Devices*, vol. ED-27, No. 11, 1980, pp. 2069-2080.

Paul Alt and Peter Pleshko; "Scanning Limitations of Liquid-Crystal Displays;" IEEE Transactions on Electron Devices; Feb. 1974; pp. 146-155.

G. Barbero; "Surface Geometry and Induced Orientation of a Nematic Liquid Crystal;" The British Library-The World's Knowledge; Lettere al Nuovo Cimento, vol. 29, N. 17; Dec. 27, 1980; pp. 553-559.

Dwight W. Berreman; "Solid Surface Shape and the Alignment of an Adjacent Nematic Liquid Crystal;" Physical Review Letters; vol. 28, No. 26; Jun. 26, 1972; pp. 1683-1686.

G. P. Bryan-Brown, E. L. Wood, and J. C. Jones; "Optimisation of the Zenithal Bistable Nematic Liquid Crystal Device (ZBD™);" Defense Evaluation and Research Agency, St. Andrews Road, Malvern, UK; Asia Display 98; pp. 1051-1054.

Noel A. Clark and Sven T. Lagerwall; "Submicrosecond Bistable Electro-optic Switching in Liquid Crystals;" Department of Physics, Chalmers Technical University, Goteborg, Sweden: Appl. Phys. Lett., vol. 36, No. 11; Jun. 1, 1980; pp. 899-901.

M. T. Gale, J. Kane, and K. Knop; "ZOD Images: Embossable Surface-Relief Structures for Color and Black-and-White Reproduction;" Journal of Applied Photographic Engineering; vol. 4, No. 2, Spring 1978; pp. 41-47.

Fritz Hohn, "Optical Lithography Forges Ahead;" Physics World; Mar. 1993; pp. 33-37.

E. L. Wood, et al.; "11.2: Zenithal Bistable Device (ZBD™) Suitable for Portable Applications;" DERA Malvern, St. Andrews Road, Malvern Worcestershire, UK; SID 00 Digest; pp. 124-127.

* cited by examiner

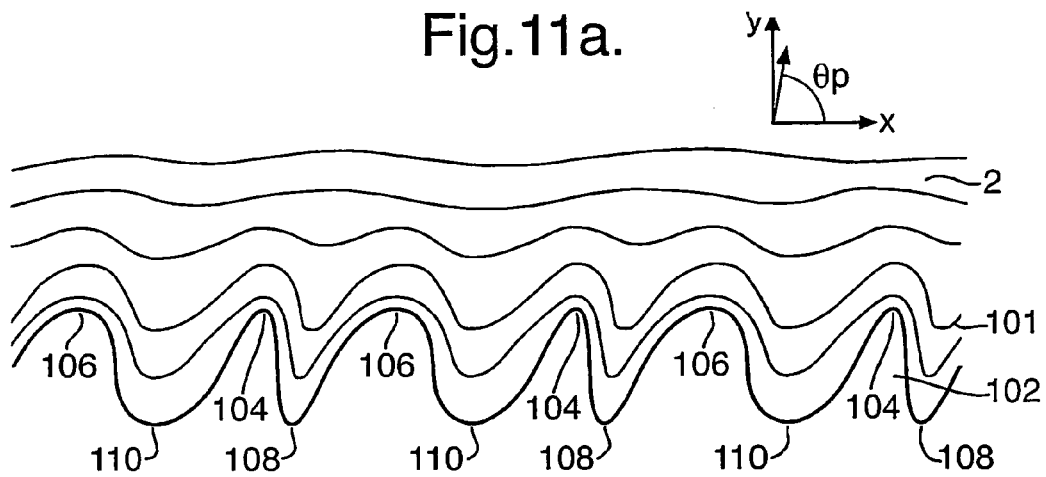
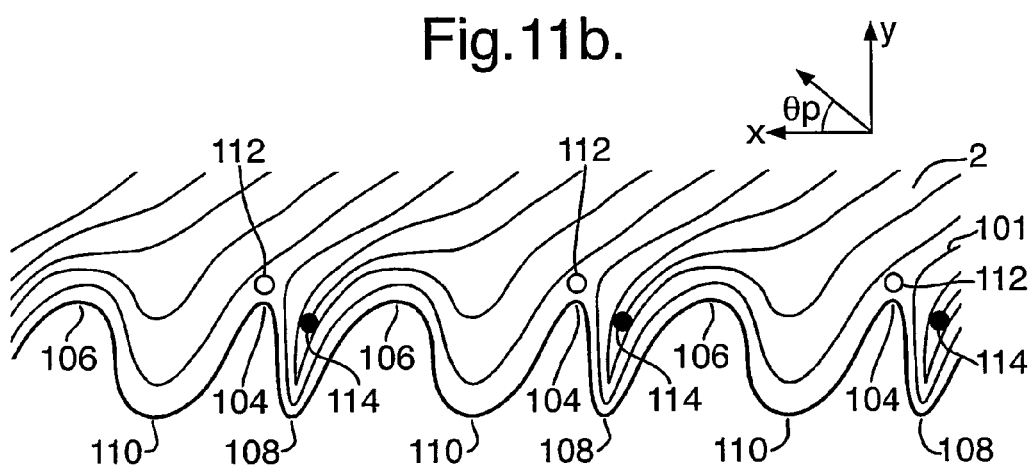
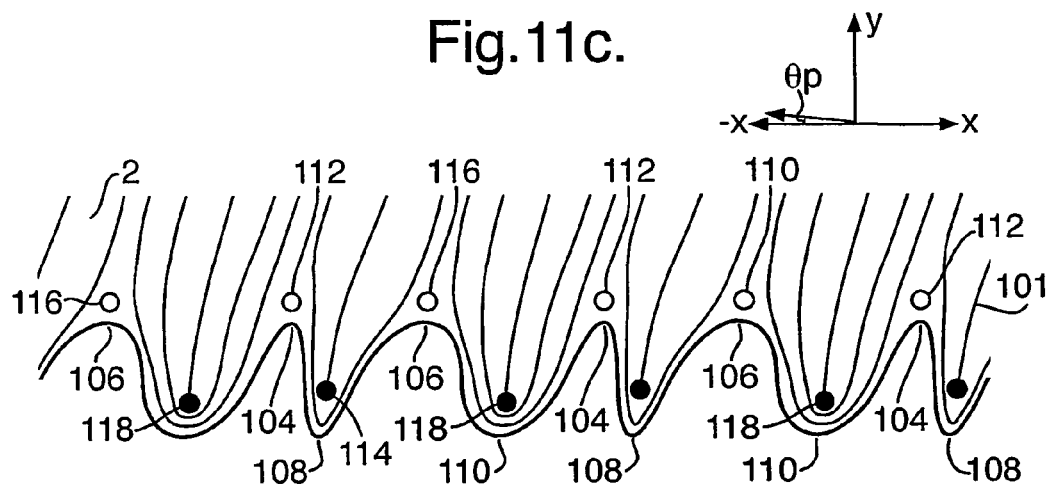

LIQUID CRYSTAL DEVICE

This application is the US national phase of international application PCT/GB01/03168, filed 18 Jul. 2001, which designated the US. PCT/GB01/03168 claims priority to GB Application No. 0017953.1, filed 21 Jul. 2000. The entire contents of these applications are incorporated herein by reference.

This invention relates to liquid crystal devices, in particular to nematic liquid crystal devices.

Liquid crystal devices (LCDs) typically comprise a thin layer of a liquid crystal material contained between cell walls. Optically transparent electrode structures on the cell walls allow an electric field to be applied across the liquid crystal layer causing a re-ordering of the liquid crystal molecules.

To produce displays with a larger number of addressable elements it is common to construct the liquid crystal device with a series of row electrodes on one wall and a series of column electrodes on the other wall. In this way a matrix of separately addressable elements or pixels is formed and a given voltage can be applied to each individual pixel in the device by applying certain voltages to given rows and columns. The technique of applying column and row voltage waveforms to switch each pixel of the display in turn is termed multiplexing.

Twisted nematic (TN) liquid crystal devices are switched to an "on" state by application of a suitable voltage, and will switch back to an "off" state when the applied voltage falls below a certain level, i.e. these devices are monostable and loss of power leads to loss of the image. TN displays can be constructed using stripes of row and column electrodes on the upper and lower cell surfaces allowing the device to be multiplexed. The number of elements that can be addressed using rms methods is limited by the steepness of the device transmission vs voltage curve as detailed by Alt and Pleschko in IEEE Trans ED vol ED 21 1974 pages 146–155. Incorporating a thin film transistor adjacent to each TN pixel improves the total number of pixels which can be addressed; such displays are termed active matrix. Active matrix TN devices have several advantages compared with rms addressed TN displays, including a relatively low operating voltage requirement and a wide temperature operating range. This allows construction of small and portable battery powered displays for applications such as laptop computers.

In addition to monostable liquid crystal devices of the type described above, devices are known where the liquid crystal can adopt two stable configurations, i.e. the device is bistable. In such a device it is possible to switch between the bistable states by applying a suitable electrical signal. After the suitable electrical signal has been applied, the liquid crystal switches into one of the two possible states and, until an electrical signal capable of switching the device into the alternative bistable state is applied, the device will remain in that state. If switching between bistable states occurs at a well defined voltage threshold, bistability also permits a high level of multiplexability because, unlike monostable devices, there is no need to keep a certain rms voltage level across each switched pixel. Additionally, conventional monostable LCDs are typically updated at 30–60 times a second regardless of whether the display image is changing. In contrast, a bistable display only needs to be updated when a new image is required. In the case of electronic paper with a viewing time of 60 s per page, a bistable display might consume only 1/3600 of the power of a monostable display assuming similar operating voltages and cell spacing etc. This would allow battery size (and weight) to be significantly reduced.

Examples of bistable liquid crystal displays include surface stabilised ferroelectric liquid crystal (SSFELC) devices as described by N A Clark and S T Lagerwall, Appl. Phys. Lett., 36, 11, 899 (1980). It has also been shown in Patent Applications WO 91/11747 ("Bistable electrochirally controlled liquid crystal optical device") and WO 92/00546 ("Nematic liquid crystal display with surface bistability controlled by a flexoelectric effect") that a nematic can be switched between two stable states via the use of chiral ions or flexoelectric coupling.

In WO 97/14990 it is shown how a zenithally bistable nematic device may be constructed using a grating of a given design such that the liquid crystal molecules can adopt two stable pretilt angles in the same azimuthal plane. The term "same azimuthal plane" is explained as follows: let the walls of a cell lie in the x, y plane, which means the normal to the cell walls is the z axis hence two pretilt angles in the same azimuthal plane means two different molecular positions in the same x, z plane. One of these states is a high pretilt state, whilst the other is a low pretilt state. The difference in energy between the states is minimised by altering the grating pitch and grating groove depth ratio for a grating of a given asymmetry, producing bistability over a range of grating conditions. This allows a device to be produced which can adopt either of two stable liquid crystal configurations. It is also demonstrated how a zero pretilt defect state, with an associated non-defect state, may be induced by a symmetrical sinusoidal grating surface.

The two zenithally stable liquid crystal configurations of WO 97/14990 persist after the driving electrical signals have been removed and the device has been shown (Wood et. al. SID Digest 00) to be highly resistant to mechanical shock, provide microsecond latching times at low driving voltages (<20V) and allow a high degree of multiplexability. WO99/34251 teaches another zenithally bistable device having a negative dielectric anisotropy material in a twisted nematic configuration.

Strictly, all bistable displays will only exhibit two stable states. In such liquid crystal devices, combinations of external polarisers, for example, can be arranged so that one of the states produces a dark (or "off") state whilst the other states produces a light (or "on") state. In many applications, such as TV displays, there is the requirement for grey-scale in addition to the "dark" and "light" states. This is commonly achieved using either temporal or spatial dither, or some combination of both with bistable technologies such as surface stabilised ferroelectric devices.

Temporal dither utilises variations of liquid crystal "dark" and "light" states for each pixel with time. Greyscale is achieved by switching each pixel "on" and "off" at a rate faster than the viewer can perceive. The average time the pixel is in the "light" state rather than the "dark" state determines the grey-level perceived. Temporal dither requires the liquid crystal to be switched at a faster rate, and therefore has disadvantages in that faster optical response times are required from the liquid crystal and the power consumption of the display is increased.

Spatial dither is achieved by having each pixel comprising two or more sub-pixel regions. These sub-pixels can be of the same area or weighted with respect to each other and switching certain combinations of the sub-pixels to the "on" and "off" states gives the perception of an overall grey level (e.g. a level with intensity in-between that of the "on" and "off" states for the pixel).

Spatial dither techniques require displays to be fabricated with a number of sub-pixel areas per pixel; this has the disadvantage of increased device fabrication complexity. Spatial dither also requires the use of separate electrical driving circuitry for each row and/or column of sub-pixels, adding to the overall complexity and cost of the electronics required to drive the device. In addition, spatial dither reduces the overall aperture ratio of the pixel, leading to a corresponding reduction in the maximum reflectivity or transmission associated with the device. The requirement to include separate row and/or column electrodes for the additional sub-pixels typically requires the electrode track width to be reduced, thereby increasing the electrical track resistance. This increases the power consumption of the display and can lead to non-uniformities of the display as the addressing signals change from one end of a line to the other.

Analogue (or domain) greyscale is also known where partial, or incomplete, switching of domains within a pixel is used so that different grey-levels can be formed from varying the number and/or size of domains in the pixel. This has been used in ferroelectric liquid crystals and bistable cholesterics.

The principal disadvantage associated with the use of domain grey-scale is that there is no operating window for the addressing waveform; that is, each grey-level is achieved with a specific addressing waveform. Ensuring the desired waveform is applied to a particular pixel is problematical because changes to the waveform applied to the rows and/or columns may arise due to losses along the resistive electrodes, variations caused by the temperature of the driving circuitry (which will depend on use and therefore will vary across the panel) or batch differences for the driving circuits. Changes in the response of the liquid crystal to the same field may also occur across the device arising, for example, from variations of cell gap, alignment, thickness of alignment layer, cell temperature, alignment of the liquid crystal, and possibly image history. Any such deviations cause a change in the electro-optic response, and hence an error in the observed analogue grey level.

Multiple threshold devices are also known, and have been used to attain analogue greyscale. In such devices, each pixel is sub-divided into areas which respond differently to applied electric fields; for example by forming holes in the electrodes, including passive dielectric layers or inducing alignment variations etc. One example of inducing multiple threshold is provided in Bryan-Brown et al, (1998) proceedings of Asia Display, p1051–1052, where it is demonstrated that grey-scale may be achieved in a zenithally bistable device using a chirped grating that allows partial switching of an area of a pixel.

Multiple threshold techniques overcome, to a limited extent, the disadvantages associated with the analogue grey-scale techniques described above. However, sub-dividing each pixel into areas with different switching characteristics adds substantial cost and complexity to the device. Moreover, it can lower the effective resolution of the device and can also lead to unwanted image artefacts for certain image patterns.

U.S. Pat. No. 4,333,708 describes how bistable nematic devices can be constructed using various surface boundary conditions. The bistability relies on the formation of defects at certain positions in various cell geometries and it is the cell itself that is bistable; not the individual cell surfaces. The different liquid crystal configurations are selected by applying certain combinations of voltages in the plane of the cell and perpendicular to the plane of the cell which causes reorientation of the bulk configurations of the liquid crystal.

U.S. Pat. No. 4,333,708 also describes how a plurality of bistable devices, each having a particular surface boundary conditions, can be combined in a single display to achieve grey-scale. Such a display would prove highly complex to manufacture.

U.S. Pat. No. 5,625,477 describes how a cholesteric liquid crystal can form either a planar texture or a focal conic texture in an appropriate cell. The cholesteric pitch is chosen so that the planar texture reflects half the incident light, whilst the focal conic texture transmits all the light and leads to a black state if the sample back is blackened. Selection of the alignment state is controlled by the amplitude the applied voltage pulse, and it was shown that the relative proportions of domains adopting the planar or focal conic texture within a pixel area can be varied by applying voltage pulses of different durations. Disadvantages of this device include difficulties associated with obtaining greyscale and colour.

It is an object of the present invention to provide a liquid crystal device with inherent greyscale that mitigates some of the disadvantages, as described above, that are associated with obtaining greyscale using spatial or temporal dither techniques.

According to the first aspect of this invention a liquid crystal device capable of adopting at least two stable states comprises a layer of liquid crystal material located between two cell walls, a means of applying a voltage to the liquid crystal layer and a surface alignment grating on the internal surface of at least one cell wall wherein the surface profile of the surface alignment grating comprises three or more defect sites per grating period with at least one $+\frac{1}{2}$ defect site per grating period and at least one $-\frac{1}{2}$ defect site per grating period so that the liquid crystal molecules can adopt any one of two or more stable pretilt angles in the same azimuthal plane in the locality of the surface and wherein the arrangement is such that two or more stable liquid crystal molecular configurations can exist and wherein application of a suitable voltage causes the liquid crystal to adopt any one of two or more stable configurations.

In one embodiment of this invention the liquid crystal molecules can adopt any one of three or more stable pretilt angles in the same azimuthal plane in the locality of the surface and wherein the arrangement is such that three or more stable liquid crystal molecular configurations can exist and wherein application of a suitable voltage causes the liquid crystal to adopt any one of three or more of the stable configurations. Preferably, one pair of $+\frac{1}{2}$ and $-\frac{1}{2}$ defect sites are situated so as to impart a low surface pretilt for one defect state.

This invention thus provides a liquid crystal device which can be switched between a plurality of different stable configurations. Therefore an inherent grey-scale capability is provided which overcomes the disadvantages associated with the spatial and temporal dither techniques described above. Furthermore, an additional advantage of this invention is that a low surface pretilt defect state can be formed which allows devices to be constructed that exhibit high optical contrast between the low surface pretilt defect state and any higher surface pretilt states. This device could also be used for phase modulation of light, for example it could be used as a Spatial Light Modulator.

In another embodiment of the invention, the low surface pretilt state is of a significantly lower energy than that of any of the other possible defect states, wherein only the non-defect state and the defect state of low pretilt can be readily selected on application of a voltage. Accordingly, this invention provides a bistable device with a difference in surface pretilt of substantially 90° between the low surface pretilt defect state and the high surface pretilt non-defect state, thereby providing optimum optical contrast between the two states. This has the advantage over the previous bistable device described in WO 97/14990 that a highly symmetrical grating is not required; the requirements for the grating design are that the defect sites are appropriately positioned. The calculation of the energy associated with a particular grating design, and the pretilt induced by such a grating design are subsequently described herein.

Conveniently, the surface alignment grating structure is treated with, or formed from, a material that induces a homeotropic alignment of the liquid crystal director with respect to the local surface direction. Various methods of inducing homeotropic alignment are well known.

Alternatively, the surface alignment grating structure is treated with, or formed from, a material that induces a planar alignment of the liquid crystal director with respect to the local surface direction. Various methods of inducing planar alignment are well known.

In further preferred embodiments, one cell wall has a surface alignment grating structure and the other cell wall has a surface which induces homeotropic alignment of the liquid crystal or induces planar homogenous alignment of the liquid crystal. Additionally, both cell walls may have surface alignment grating structures.

The liquid crystal material may be a nematic liquid crystal material, in particular nematic liquid crystal material with a positive dielectric anisotropy. If the surface alignment grating structure is treated with, or formed from, a material that induces a planar alignment of the liquid crystal director with respect to the local surface direction a nematic liquid crystal material with a negative dielectric anisotropy is preferred. The term nematic liquid crystal is taken herein to include long pitch cholesteric materials.

Preferably the pitch of the surface alignment grating structure is within the range of 0.1 µm to 10 µm. More preferably the pitch is greater than 500 nm, more preferably the pitch is greater than 800 nm and more preferably the pitch is greater than 1000 nm. Furthermore, it is convenient for the pitch to be less than 5 µm and more convenient for the pitch to be less than 2 µm.

Advantageously, the groove depth of the surface alignment grating structure is within the range of 0.05 µm to 3 µm and the two cell walls are separated by between 1 µm to 20 µm.

In one embodiment of the invention a means of applying a plurality of voltages to the liquid crystal layer comprises a layer of electrically conductive, and substantially optically transparent, material applied to the internal surface of both cell walls. Furthermore the layers of electrically conductive material applied to the internal surface of both cell walls may be patterned so as to produce an array (or matrix) of addressable pixels. The electronics required to pass suitable electrical signals to an array of addressable pixels (i.e. multiplexing a matrix device) would be well known to a person skilled in the art.

In another embodiment of the invention the liquid crystal device further comprising a means for optically distinguishing between at least two of the stable liquid crystal configurations adopted. The means for optically distinguishing between at least two of the liquid crystal configurations may comprise a pair of polarisers placed one either side of the liquid crystal device with their respective optic axes aligned with respect to the liquid crystal device such that the amount of light transmitted through the liquid crystal display will differ depending on which liquid crystal configuration is adopted, an optically reflective layer placed one side of the liquid crystal device and a polariser placed the other side of the liquid crystal device with its optic axis aligned with respect to the liquid crystal device such that the amount of light reflected by the device will differ depending on which liquid crystal configuration is adopted, or a dichroic dye, the dye being added to the liquid crystal such that the amount of light absorbed by the liquid crystal display will differ depending on which liquid crystal configuration is adopted. Many other methods of optical distinguishing between the liquid crystal configurations, such operating the device in a scattering mode as described in GB patent application 9928126.3, are well known to persons skilled in the art.

According to a second aspect of this invention, a multi-stable liquid crystal device comprises a layer of liquid crystal material located between two cell walls and a means of applying a voltage to the liquid crystal material wherein a surface alignment grating structure on the internal surface of at least one cell wall has a surface profile which is such so as to induce the liquid crystal molecules to adopt any of three or more stable pretilt angles in the same azimuthal plane and wherein the arrangement is such that three or more stable liquid crystal molecular configurations can exist and wherein application of a suitable voltage causes the liquid crystal material to adopt any one of three or more stable configurations. In a preferred embodiment three different pretilt angles in the same azimuthal plane can be adopted.

As described above, having three or more stable liquid crystal configurations is advantageous in obtaining grey-scale.

As described above a low surface pretilt state, and a high surface pretilt state, allows optimum optical contrast be achieved. Thus according to a third aspect of this invention, a bistable liquid crystal device comprises a layer of liquid crystal material located between two cell walls, a means of applying a voltage to the liquid crystal layer and a surface alignment grating on the internal surface of at least one cell wall wherein the surface profile of the surface alignment grating comprises three or more defect sites per grating period with at least one +½ defect site per grating period and at least one −½ defect site per grating period wherein one pair of +½ and −½ defect sites are situated so as to impart low surface pretilt in the azimuthal plane to one defect state wherein such low pretilt state is of a significantly lower energy than that of any of the other possible defect states wherein only the non-defect state and the defect state of low surface pretilt can be readily selected on application of a voltage. Low surface pretilt can be considered to be lower than 20°, preferably lower than 10° and more preferable less than 5°.

The concept of liquid crystal defects, liquid crystal defect states and an explanation of the physical properties of a grating structure which cause defects to form (termed "defect sites") as used above are well known to a person skilled in the art and are described in more detail below.

The invention will now be described, by way of example only, with reference to the accompanying drawing of which;

Figure 10A:
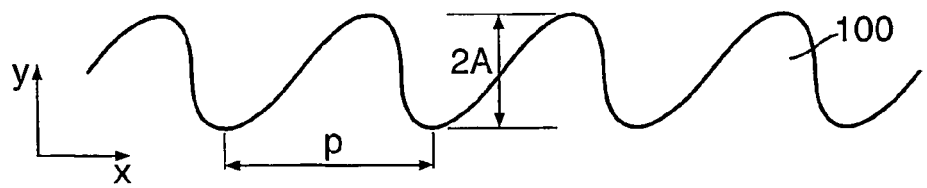
Figure 10B:
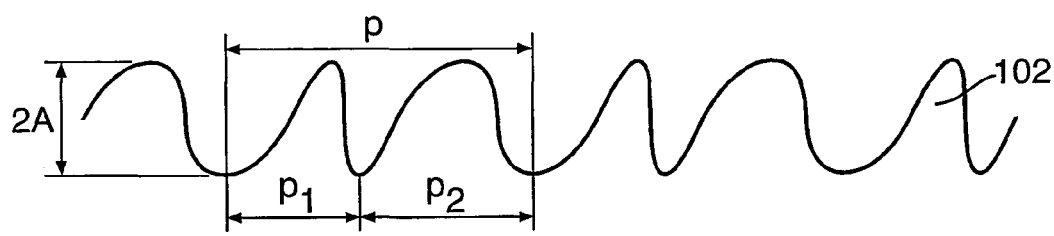
Figure 10C:
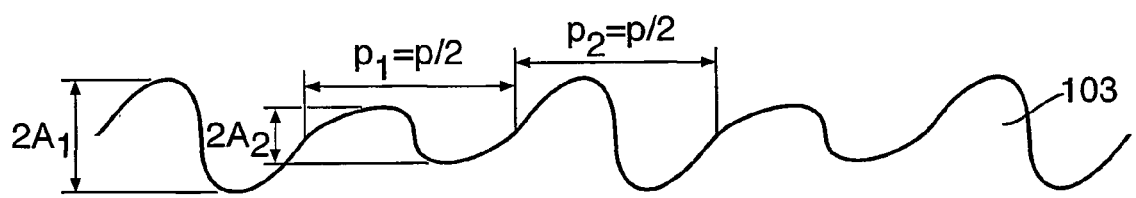
Figure 10D:
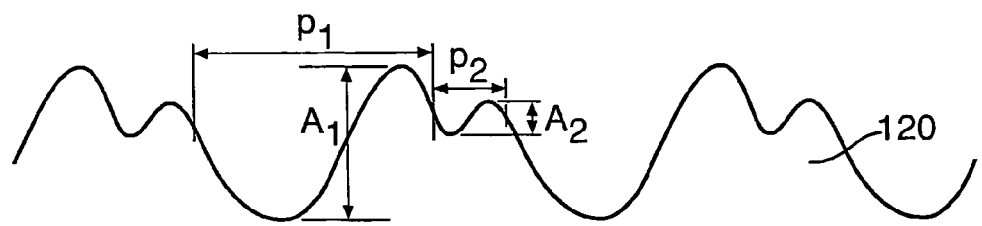
Figure 14:
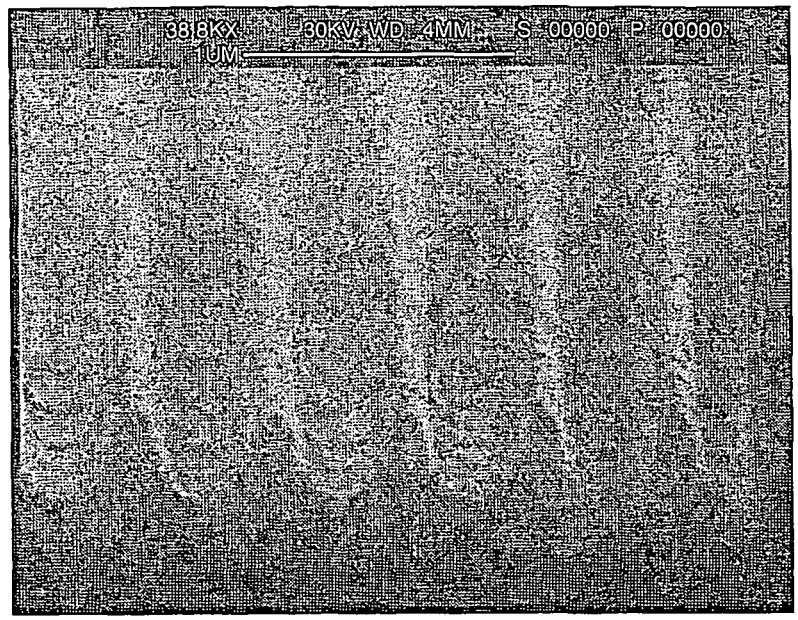
Figure 15:
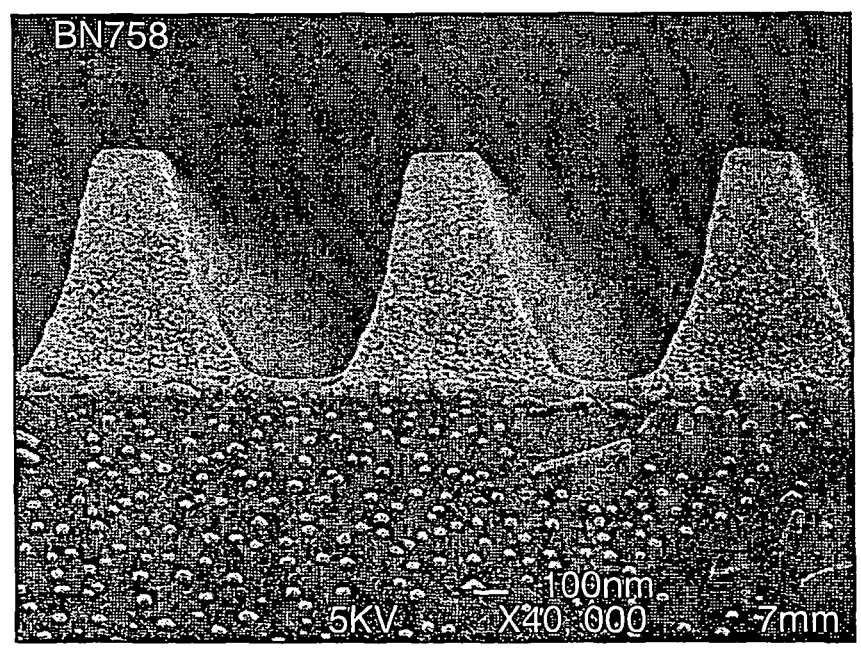
Figure 16:
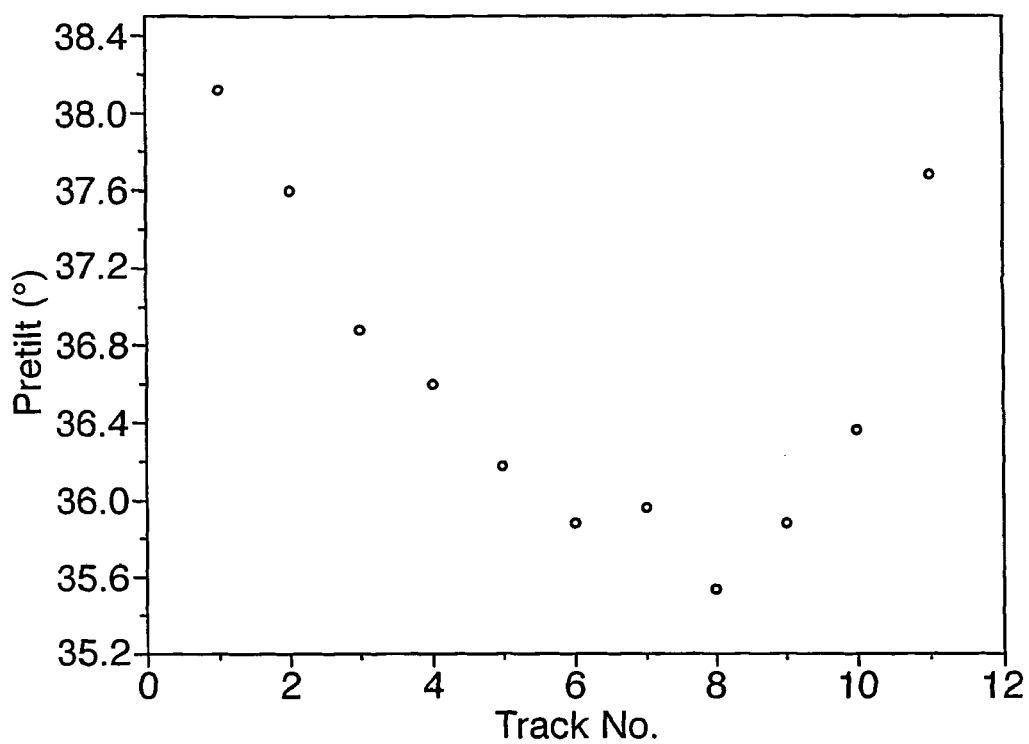
Figure 17:
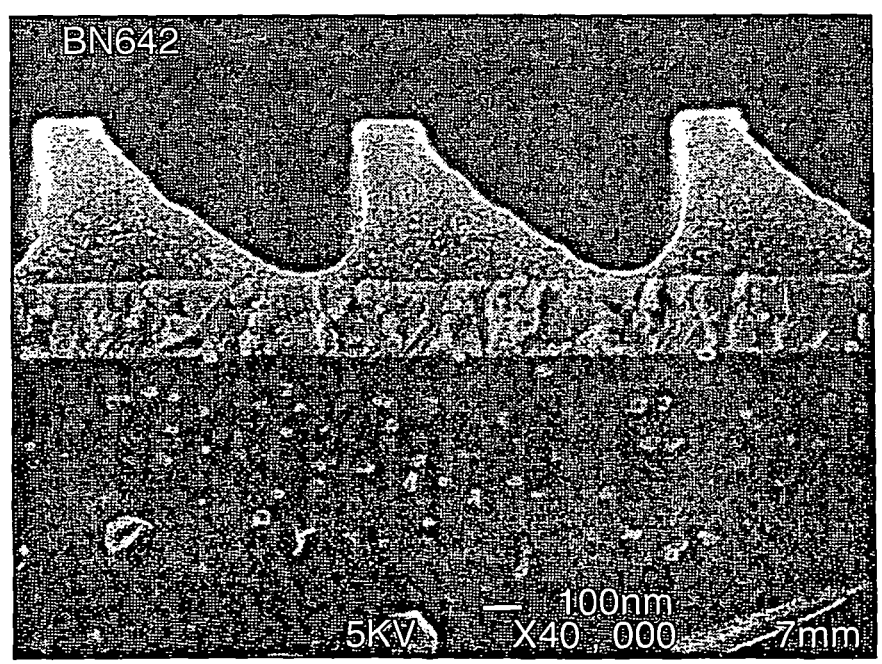
Figure 18:
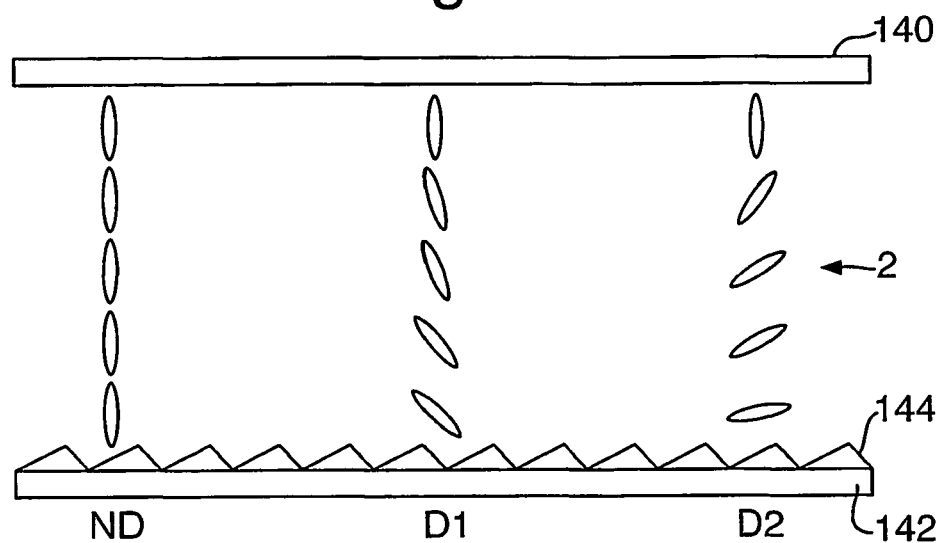
Figure 19A:
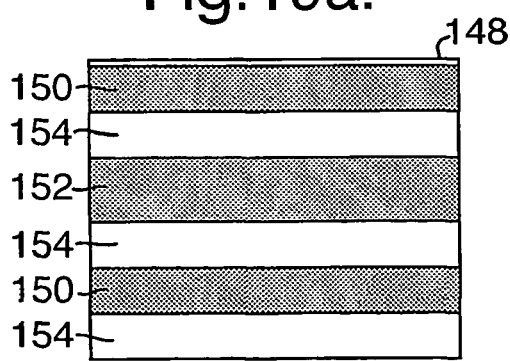
Figure 19B:
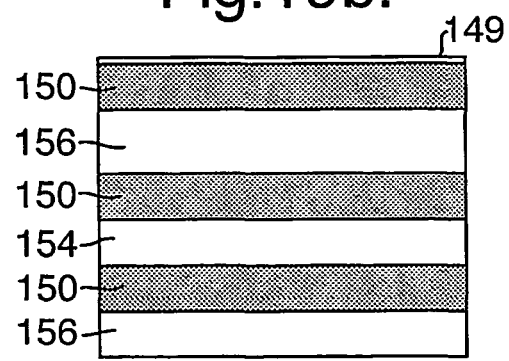
Figure 20:
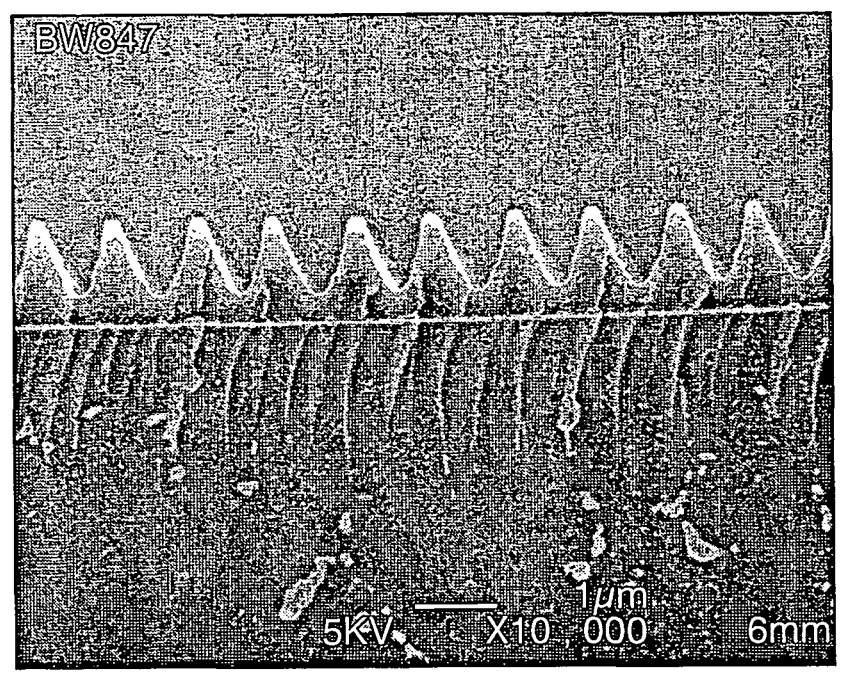
Figure 21:
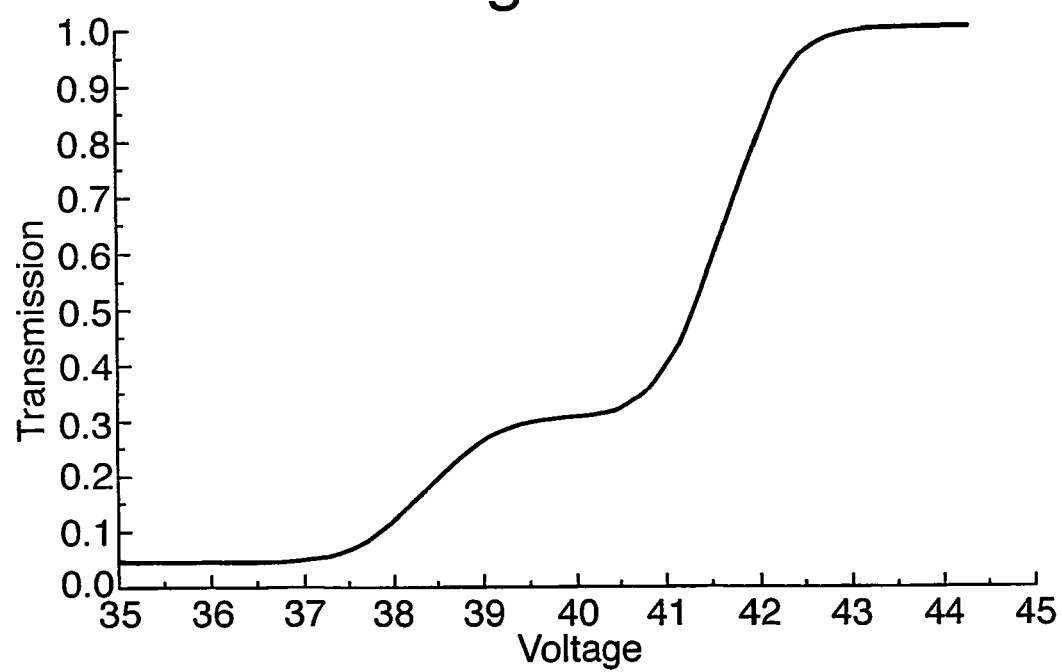
Figure 22:
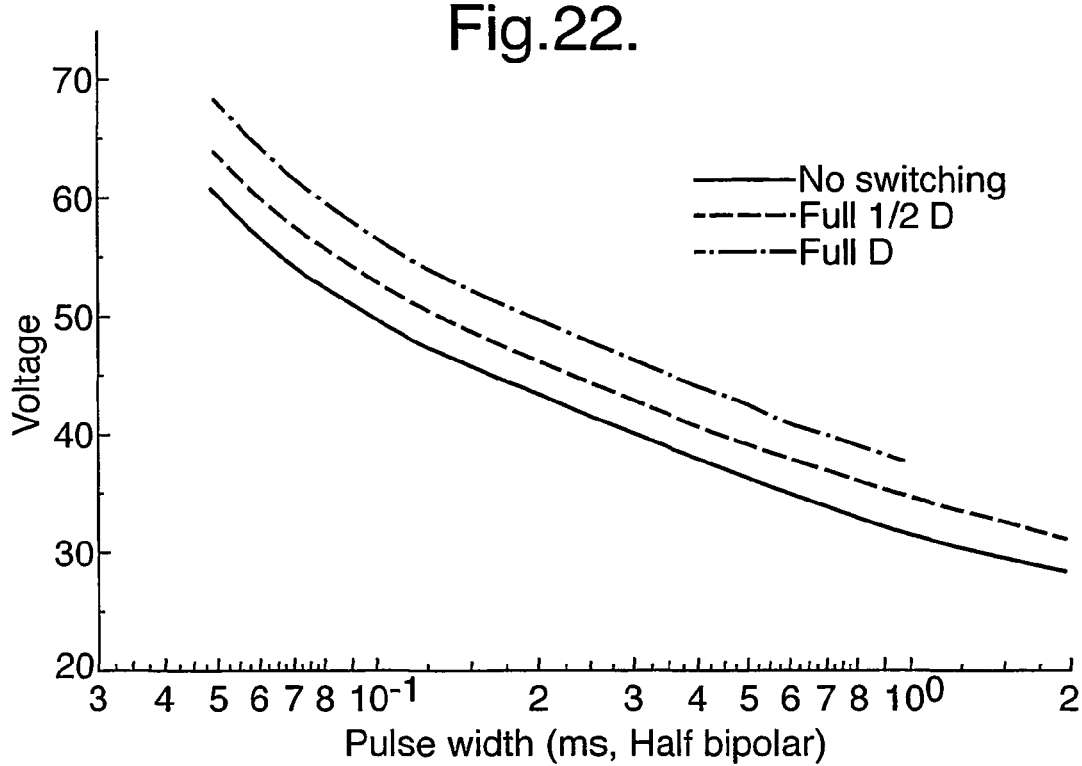

FIG. 10 shows a cross section of a) an asymmetric blazed grating, b) an asymmetric blazed grating having two distinct sub-grating elements of different pitch per unit length, c) an asymmetric blazed grating having two distinct sub-grating elements of different amplitude per unit length and d) an asymmetric blazed grating having two distinct sub-grating elements of different amplitude and pitch per unit length;

FIG. 11 shows a cross-section of the grating of FIG. 10(b), and further shows three of the six possible liquid crystal configurations that may form on such a grating;

FIG. 12 shows a cross-section of the grating of FIG. 10(d), and further shows three of the six possible liquid crystal configurations that may form on such a grating;

FIG. 13 shows a cross section of a cell configuration, incorporating one multi-stable surface, which allows selection of the non-defect and multiple defect states;

FIG. 14 shows a cross sectional SEM image of a holographically defined symmetric grating;

FIG. 15 shows a cross sectional SEM image of a photolithographically defined symmetric grating;

FIG. 16 shows the measured pretilt induced to a nematic liquid crystal, by the photolithographically defined symmetric grating, as a function of grating exposure. (corresponding to track number);

FIG. 17 shows a cross sectional SEM image of a grating surface used to form a tri-stable device;

FIG. 18 shows a cross section of the cell and associated liquid crystal configuration of the tri-stable device;

FIG. 19 shows a schematic plan view of two designs of mask that may be used to create an alternating groove grating structure;

FIG. 20 shows a cross sectional SEM image of a grating fabricated using a mask of the design shown in FIG. 19;

FIG. 21 is a graphical representation of the measured transmission, as a function of applied voltage, of a device incorporating the grating shown in FIG. 20; and FIG. 22 is a graph of the measured voltage and pulse widths required to attain any of three stable device configurations of the tri-stable device; and FIG. 23 is a schematic illustration of the transmission versus applied electrical energy characteristics of prior art devices compared with the characteristics of a tri-stable device according to the present invention.

BACKGROUND

To put the present invention into context, a description of the zenithal bistable device of WO 97/14990 will be given with reference to FIGS. 1 and 2 wherein a liquid crystal layer (1) is in contact with an asymmetric surface alignment grating (1) of pitch W and groove depth h. The liquid crystal director is denoted by the vector n. The contour lines (3) are perpendicular to orientation of the liquid crystal director (n) and the grating surface has been treated, for example by coating with a homeotropic surfactant (not shown), to induce local homeotropic alignment of the liquid crystal at the interface (4) between the liquid crystal layer (2) and the surface alignment grating (1).

The term homeotropic takes the meaning, well known to a person skilled in the art, that the director (n) is oriented substantially perpendicularly to the local surface and herein a surface alignment grating is taken to mean an array of repeating elements of a unit length, as would be understood by a person skilled in the art. Herein the term "same azimuthal plane" is explained as follows: let the walls of a cell lie in the x, z plane, which means the normal to the cell walls is the y axis. Two pretilt angle in the same azimuthal plane means two different molecular positions in the same x, y plane. Herein, as defined in FIG. 1, the term pretilt shall mean the tilt of the director away from the x-z plane at some distance away from the surface where the director is invariant in the x-z plane; hence perfectly planar alignment gives zero pretilt and perfectly homeotropic alignment gives 90° pretilt.

It was demonstrated in a particular embodiment of WO 97/14990 that a nematic liquid crystal in contact with an alignment grating surface coated with a homeotropic surfactant can adopt either a non-defect (FIG. 1a) or defect (FIG. 1b) alignment configuration. Liquid crystal defects can, in simple terms, be considered as a local area of discontinuity in the director field and are well known to persons skilled in the art. A summary of the theory relating to liquid crystal defects and disclinations can be found in P. G. deGennes, "The physics of liquid crystals" (Clarendon press, 1974).

Figure 1A:
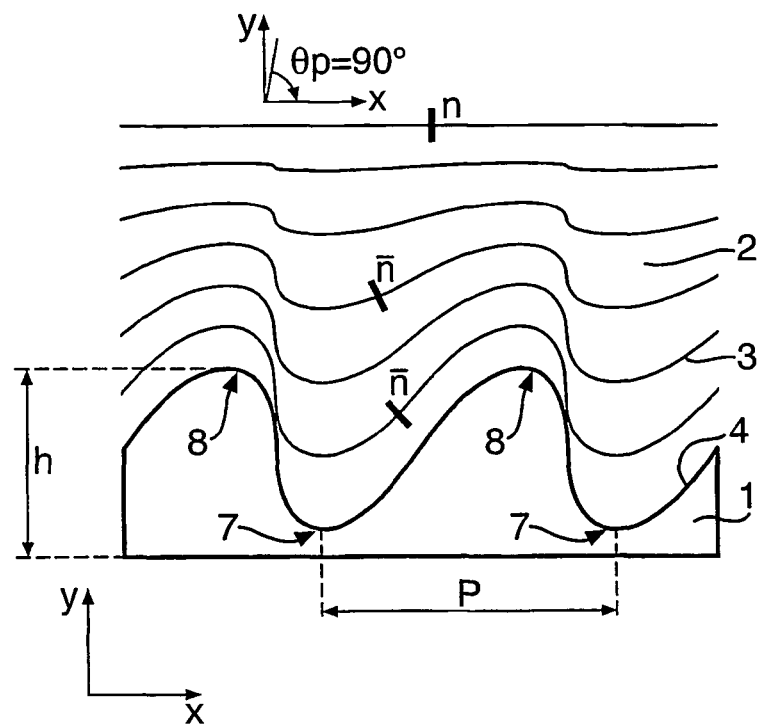
FIG. 1 shows a cross section of the two possible liquid crystal director configurations (with contour line representation of the director field) on the grating surface of a zenithal bistable device as described in WO 97/14990.

In the non-defect structure of FIG. 1a the nematic liquid crystal will, at the interface (4) between the surface alignment grating (1) and the liquid crystal (3), orient so as to be substantially perpendicular to the local surface of the grating (1). Within a short distance of the grating-liquid crystal interface (4), compared with the overall thickness of the liquid crystal cell, the liquid crystal will adopt a homeotropic alignment configuration of $\theta_p \approx 90°$.

Figure 1B:
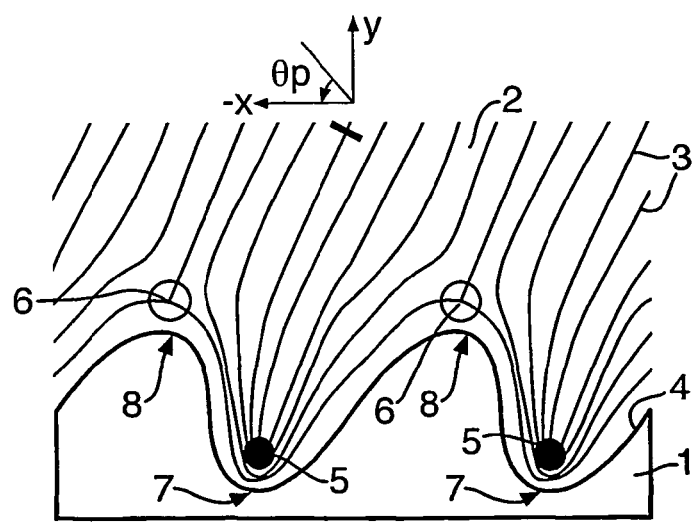

In the defect structure of FIG. 1b, so-called defects of strength $-\frac{1}{2}$ (5) will form in the vicinity of concave defect sites (7) and so-called defects of strength $+\frac{1}{2}$ (6) will form in the vicinity of convex defect sites (8). The result of the formation of the $+\frac{1}{2}$ and $-\frac{1}{2}$ defect pair is that within a short distance of the grating-liquid crystal interface (4), as compared with the overall thickness of the liquid crystal cell, the nematic liquid crystal will adopt a configuration of a pretilt (in this example $\theta_p \sim 45°$) lower than that formed for the non-defect structure of FIG. 1a. Note that defects can only occur in pairs, and each pair must be of an equal and opposite magnitude. A more complete explanation of defects of strength $+\frac{1}{2}$ and $-\frac{1}{2}$ can be found in P. G. deGennes, "The physics of liquid crystals" (Clarendon press, 1974), and would be known by a person skilled in the art.

Herein, defects of strength of approximately $-\frac{1}{2}$ (within a range of $-1$ to $0$) and $+\frac{1}{2}$ (within a range of $0$ to $1$) are termed the "$-\frac{1}{2}$ defect" and the "$+\frac{1}{2}$ defect" respectively. The positions on a grating surface where $+\frac{1}{2}$ and $-\frac{1}{2}$ defects form are associated with regions of convex and concave minimum radii of curvature of the grating surface. The terms "$-\frac{1}{2}$ defect site" and "$+\frac{1}{2}$ defect site", are taken to mean the region on a grating surface where a person skilled in the art would reasonably expect either a $-\frac{1}{2}$ or $+\frac{1}{2}$ defect to form using common general knowledge, documents such as P. G. deGennes, "The physics of liquid crystals" (Clarendon press, 1974), and the teachings contained hereinafter. The term "defect site" means either a –½ defect site or a +½ defect site and "defect sites" is simply more than one such defect site.

A suitable cell configuration to exploit the existence of the bistable surface described with respect to FIG. 1, is shown in cross section in a stylised form in FIG. 2. The cell configuration of FIG. 2 comprises a layer of nematic liquid crystal material with a positive dielectric anisotropy (2) sandwiched between a first glass wall (9) and a second glass wall (10). The first glass cell wall (10) is treated, for example by coating with lecithin (not shown), to induce homeotropic alignment of the nematic liquid crystal at the glass cell wall and liquid crystal interface (11). The second glass cell wall (10) is coated with a bistable surface alignment grating (1), the profile of which is as described with respect to FIG. 1.

Figure 2A:
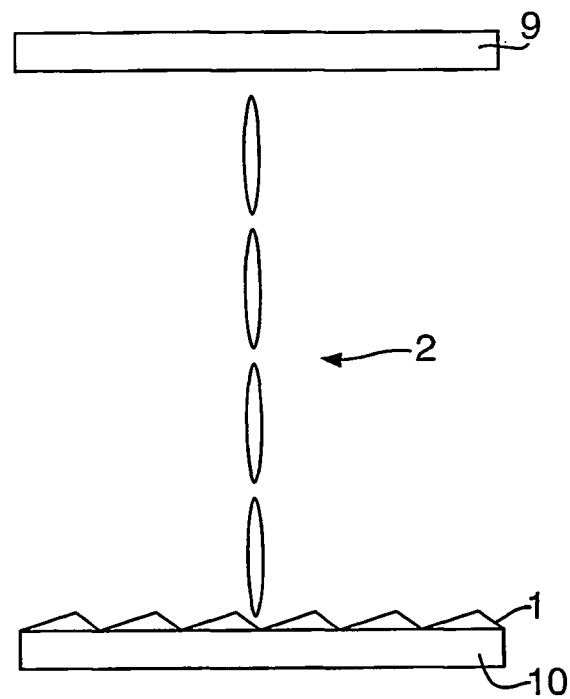
FIG. 2 (prior art) shows a cross section of a cell configuration which allows bistable switching between the two states of the embodiment of the zenithal bistable device of FIG. 1.
Figure 2B:
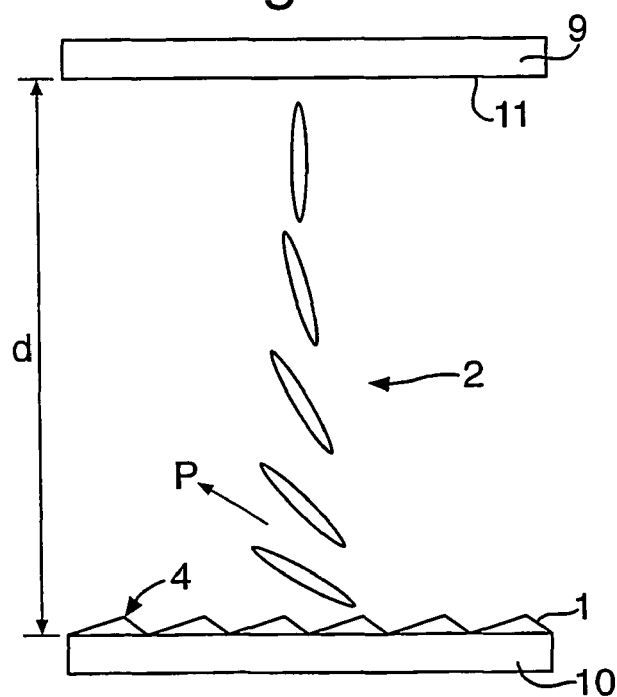

The device of FIG. 2 allows the liquid crystal molecules to adopt either of two stable configurations, as shown in FIGS. 2a and 2b.

In FIG. 2a, homeotropic alignment of the liquid crystal is induced at the first substantially flat cell wall surface (9) because of the homeotropic treatment (not shown). At the second cell wall (10) the liquid crystal (2) adopts a non-defect state (as described with respect to FIG. 1a) and induces homeotropic alignment of the liquid crystal (2) within a short distance, with respect to the overall thickness of the liquid crystal cell (d), of the grating-liquid crystal interface (4). A uniform homeotropic (high tilt) alignment of the liquid crystal is obtained throughout the bulk of the cell.

In FIG. 2b, homeotropic alignment of the liquid crystal is obtained at the first substantially flat cell wall surface (9) because of the homeotropic treatment (not shown). At the second cell wall (10) the surface alignment grating (1) adopts a defect state (as described with respect to FIG. 1b) and induces low tilt alignment (in this example $\theta_p \approx 45°$) of the liquid crystal (2) within a short distance, with respect to the overall thickness of the liquid crystal cell (d), of the grating-liquid crystal interface (4). A splayed liquid crystal structure is thus formed. For many nematic materials, a splay or bend deformation will lead to a macroscopic flexoelectric polarisation, which is represented by the vector P in FIG. 2. A dc pulse is used to couple to this polarisation and depending on its sign will either favour or disfavour the configuration of FIG. 2(b). The application of pulses of positive and negative sign can be used to drive the system between the two stable states.

Simple Model of Grating Induced Surface Pretilt

The pretilt associated with a particular pair of +½ and –½ defects has been found to depend on the relative positions of the +½ and –½ defects per grating period. A model of the pretilt induced at a surface by a grating structure will now be described with reference to FIGS. 1 to 3.

Consider a nematic liquid crystal restricted in a configuration such that at all points the director of the liquid crystal is parallel to the x-y plane. Let θ(x, y) be the tilt angle between the director at (x,y) and the x-axis. Then, in an untwisted configuration, θ(x, y) completely specifies the director field.

The static director field is governed by a torque balance equation obtained from minimising the Frank-Oseen free energy of a nematic liquid crystal. Under planar configuration and taking an approximation that the splay and bend elastic constants are equal, both the Frank-Oseen free energy expression and the corresponding torque balance equation can be reduced to a simple form as:

$$G = \frac{K}{2} \int dx dy \left\{ \left( \frac{\partial \theta}{\partial x} \right)^2 + \left( \frac{\partial \theta}{\partial y} \right)^2 \right\} \quad (1)$$

$$0 = \left( \frac{\partial^2}{\partial x^2} + \frac{\partial^2}{\partial y^2} \right) \theta \quad (2)$$

where G is the Frank-Oseen free energy per unit length and K is the bend or splay elastic constant. The torque balance equation 2 is simply the Laplace equation. It is well-known in complex variables that any analytic function is a solution to the Laplace equation. In particular, if we seek solutions for a configuration of disclination lines normal to the x-y plane, the problem is directly analogous to the potential flow fluid mechanics or two dimensional electrostatics; see for example M. R. Speigel, "theory and problems of complex variables" (Schaum, New York, 1964) and P. M. Morse and H. Feshbach, "Methods of theoretical physics" (McGraw-Hill, New York, 1953). The equivalents of the disclination lines are the line sources or sinks in potential flow fluid mechanics and line charges in two dimensional electrostatics.

For an isolated disclination core at the origin and with the boundary condition that the directors are un-anchored at infinity, solution to the Laplace equation 2 is given by:

$$\theta = \frac{M}{2} \wp \{\ln(x + iy)\} + \alpha \quad (3)$$

$$= \frac{M}{2} \tan^{-1}\left(\frac{y}{x}\right) + \alpha \quad (4)$$

where denotes the imaginary part of a complex function, M/2 is the strength of the disclination and the angle, α, is an arbitrary constant of integration. m is an integer necessary to ensure that the director orientation is preserved in any close circuit which enclosed the disclination core at the origin. Equation 3 is well-known as the stream line function in potential flow fluid mechanics or the flux line function in two dimensional electrostatics.

Having obtained the tilt function of 2 for the director field, the free energy 1 can be readily evaluated, see for example P. G. deGennes & J Prost, "The physics of liquid crystals" (Academic, New York, 1993), to yield:

$$G = \frac{K\pi}{4} M^2 \ln\left(\frac{R}{\lambda}\right) \quad (5)$$

where R is the dimension of the system and λ is the disclination core radius, and is typically the order of a few molecular lengths (circa 100 Å). Note that the free energy, G, diverges logarithmically with the system size.

If a configuration of parallel disclination lines with their cores pinned at the points $(a_1, b_1), \ldots, (a_n, b_n) \ldots$ in the x-y plane is considered, then the tilt angle θ(x, y) which specifies the director field is the superposition of the contributions from each individual disclination lines is:

$$\theta = \sum_n \theta_n(x,y) + \alpha \quad (6)$$

where $$\theta_n = \frac{M_n}{2}\wp\{\ln(x - a_n + i(y - b_n))\} \quad (7)$$

$$= \frac{M_n}{2}\tan^{-1}\left(\frac{y-b_n}{x-a_n}\right) \quad (8)$$

$\theta_n$ defines the director field due an isolated disclination line of strength $M_n/2$ pinned at $(a_n,b_n)$. Similarly, the free energy, G, is also the sum of all individual contributions:

$$G = \frac{K}{2}\int dxdy \left|\sum_n \left(\frac{\partial \theta_n}{\partial x}, \frac{\partial \theta_n}{\partial y}\right)\right|^2 \quad (9)$$

$$= \frac{K\pi}{4}\sum_n M_n^2 \ln\left(\frac{R}{\lambda}\right) + \frac{K}{2}\sum_{n \neq n'}\int_{r_{nn'}}^R \{\theta_n\}\left(\frac{M_{n'}}{2}\right)\frac{dr}{r} \quad (10)$$

$$= \frac{K\pi}{4}\left(\sum_n M_n\right)^2 \ln\left(\frac{R}{\lambda}\right) + \frac{K\pi}{4}\sum_{n \neq n'} M_n M_{n'}\ln\left(\frac{R}{r_{nn'}}\right) \quad (11)$$

where $$r_{nn'} = |(a_n,b_n) - (a_{n'},b_{n'})| \quad (12)$$

Equation 3 is a generalisation of the case of a pair of disclination lines as described in, for example, P. G. deGennes & J Prost, "The physics of liquid crystals" (Academic, New York, 1993). The integral in equation 10 is obtained by an integration by parts technique. The integral is performed along a cut from $(a_n,b_n)$ in the direction of $(a_n,b_n)-(a_n',b_n')$. Along the cut, $\theta_n$ goes through a discontinuous change of $2\pi M_n$ as one traverses across the cut in the anti-clockwise direction. Evaluated the integral 10 yields equation 11 for the free energy. As noted in P. M. Chaikin & T. C. Lubensky, "Principles of condensed matter physics" (Cambridge University Press, 1995), the lnR divergence in part of equation 11 can be eliminated if the sum of the strengths of all disclination lines in the system is zero.

Consider a simple case in which an infinite array of disclination lines each with strength ±M/2 are pinned at regular interval of L at positions ±(a−nL, b) where n is an integer in the range [−∞, ∞]. Let z=x+iy and c=a+ib. By using equation 6, one obtains the tilt angle function for the director field:

$$\theta = \frac{M}{2}\sum_{n=-\infty}^{\infty}\wp\{\ln(z-c-nL)\} - \frac{M}{2}\sum_{n=-\infty}^{\infty}\wp\{\ln(z+c-nL)\} + \alpha \quad (13)$$

$$= \frac{M}{2}\wp\left\{\ln\left[\frac{z-c}{z+c}\prod_{n=1}^{\infty}\frac{1-\left(\frac{z-c}{nL}\right)^2}{1-\left(\frac{z+c}{nL}\right)^2}\right]\right\} + \alpha \quad (14)$$

$$= \frac{M}{2}\wp\left\{\ln\left[\frac{\sin\frac{\pi}{L}(z-c)}{\sin\frac{\pi}{L}(z+c)}\right]\right\} + \alpha \quad (15)$$

Equation 15 was obtained from equation 14 by using the infinite products expansion of the sine function as in, for example, P. M. Morse and H. Feshbach, "Methods of theoretical physics" (McGraw-Hill, New York, 1953). In regions far from the array, $$\lim_{y \to \pm\infty}\theta = \pm\frac{M}{2}\left\{\tan^{-1}\left[\frac{\tan\frac{\pi}{L}(x-a)}{\tanh\frac{\pi}{L}|y|}\right] - \tan^{-1}\left[\frac{\tan\frac{\pi}{L}(x+a)}{\tanh\frac{\pi}{L}|y|}\right]\right\} + \alpha \quad (16)$$

$$= \pm\frac{M}{2}\left\{\pi\frac{2a}{L}\right\} + \alpha \quad (17)$$

From equation 17 it can be seen that the grating will induce zero pretilt when a =L/2. Thus for a symmetrical sinusoidal grating, as described in WO 97/14990, +½ and −½ defects will form along the grating equally spaced by the distance a (which is half the grating pitch length L). This defect configuration produces a zero pretilt defect state.

Figure 3:
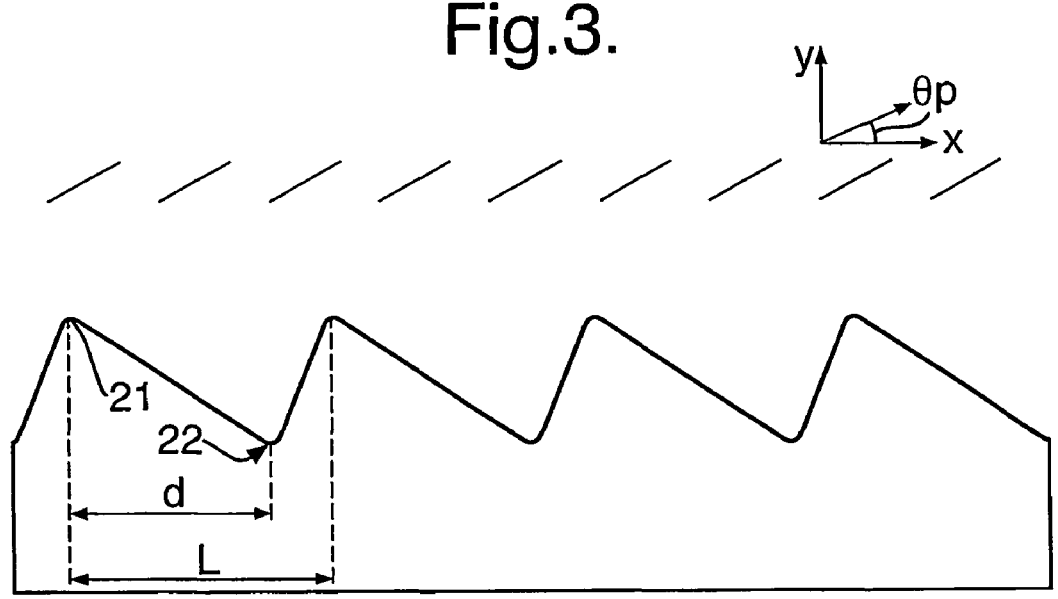
FIG. 3 shows a cross section of an asymmetric grating structure indicating defect sites.

Referring to FIG. 3, if within one period of the grating there is only one position of maximum curvature which is convex and only one which is concave and the zero pretilt condition a=L/2 is not fulfilled (in this case because the grating is asymmetric) the alignment grating will induce a finite surface tilt. For the asymmetric grating structure of FIG. 3, +½ defects will form at the +½ defect sites (21) and −½ defects will form at the −½ defect sites (22) and the surface alignment grating will impart a pretilt to the liquid crystal, within a short distance of the surface compared to the overall cell thickness, according to equation 17.

From the model described above it can been seen that it is the position of defect pair formation, and not the degree of symmetry of the grating surface, which determines the surface pretilt that is imparted to a liquid crystal layer by a surface alignment grating at a short distance from the grating surface.

Detailed Model of Grating Induced Surface Pretilt.

A more rigorous analytical model of the liquid crystal pretilt induced by the formation of defects on a surface alignment grating will now be described.

Figure 4:
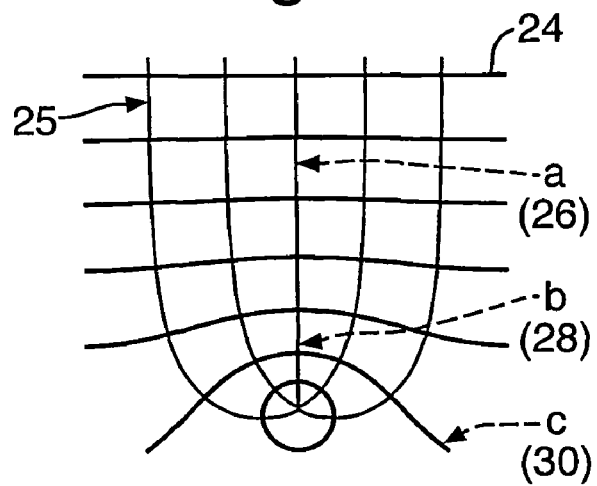
FIG. 4 shows a geometrical interpretation of ρ in the z-plane.

Theoretical examples derived from the model will then be described with reference to FIGS. 4 and 5.

Surface deformation of a nematic liquid crystal due to the shape of a surface interface have been investigated. Only interfaces with a periodic profile and homeotropic surface alignment of the liquid crystal are considered. For smooth surfaces with no kink, surface line defects with integral $\pi$ topology nucleated on the interface surface can have full translational freedom on the surface. The model described hereinafter analyses the energetics of the line surface defects. Under equal elastic approximation and assumed planar director field, the only relevant field variable for the director field is the tilt angle $\theta$ of the director and the governing static equation is the Laplace equation. By means of a conformal mapping techniques, $\theta$ and the surface deformation energy can be obtained without the small amplitude approximation used by Berreman (W. D. Berreman, Phys. Rev. Lett. 28, 1683 (1972)) and deGennes (P. G. deGennes, "Physics of liquid crystals", Oxford, 77 (1974)). Unlike Barbero (G. Barbero, Lett Nuovo Cimento, 29, 553 (1980)), only smooth surfaces are considered and hence there is no surface defect pining.

Let w=u+iv be the conformal co-ordinates of the transformed z=x+iy co-ordinates such that v=0 corresponds to the surface profile y=η(x). Consider an array of surface line defects of alternating strength ±mπ at the positions $\lambda_\pm + 2\pi n$ where n=(−∞, ∞) on the v=0 line. The total surface deformation energy per period per unit length for a surface with a periodic maximum and minimum energy is:

$$g = \frac{K}{2L}\int_0^\infty dv \int_0^L du \left\{ \frac{\partial \rho}{\partial u}\frac{\partial \theta}{\partial v} - \frac{\partial \rho}{\partial v}\frac{\partial \theta}{\partial u} \right\} \quad (18)$$

$$\approx \frac{K}{2L}\pi \left\{ [\max(\rho) - \min(\rho)] + |m|[\rho(\lambda_+) - \rho(\lambda_-)] + \right. \quad (19)$$
$$\left. |m|^2 \ln\left[\frac{\sin^2((\lambda_+ - \lambda_-)/2)}{\sin^2(a/2)}\right] \right\}$$

where $\rho$ is the harmonic conjugate of $\theta$ and a is the radius of the defect line core measured in w. The first square bracket term of equation 19 is the nematic deformation energy without any defect. The middle square bracket term of equation 19 is due to the coupling of the defect and non-defect deformation. The last term of equation 19 depends only on the defects. With g, the energetic stability of the defect can be analysed with respect to the variation of $\lambda_\pm$ and m. The director configuration is specified by the tilt angle:

$$\rho + i\theta = \ln\frac{dw}{dz} + \sum_{\alpha=\pm} \alpha|m|\ln\sin\left(\frac{w-\lambda_\alpha}{2}\right) + i\theta_0 \quad (20)$$

where $\theta_0$ is the alignment angle of the director at the interface (i.e. local) surface.

In the limit $v=\infty$, hence $$\lim_{v\to\infty} \theta = \sum_{\alpha_\pm} \alpha|m|\text{Im}\left\{\ln\left[\sin\left(\frac{w-\lambda_\alpha}{2}\right)\right]\right\} + \theta_0 \quad (21)$$

$$= -|m|\left(\frac{\lambda_+ - \lambda_-}{2}\right) + \theta_0 \quad (22)$$

If a periodic surface profile, with a multitude of maxima and minima within a single period, is considered the surface energy, g, is generalised to:

$$g = \frac{K}{2L}\pi(g_0 + g_{od} + g_{dd}) \quad (23)$$

where $g_0$, $g_{od}$ and $g_{dd}$ correspond to the surface energies due to the purely non-defect field, non-defect-defect field coupling and defect-anti-defect field coupling, where:

$$g_o \approx \sum_{i_{\max},j_{\min}} (\rho i_{\max} - \rho j_{\min}) \quad (24)$$

$$g_{od} = \sum_\alpha m_\alpha \rho(\lambda_\alpha) \quad (25)$$

$$g_{dd} = \sum_{\alpha,\beta} m_\alpha m_\beta \ln\left[\sin^2\left(\frac{\lambda_\alpha - \lambda_\beta}{2}\right)\right] \quad (26)$$

The equations above are only valid for $$\sum_\alpha m_\alpha = 0,$$

otherwise g will increase linearly with the system height. Notice that $g_o$ and $g_{dd}$ are always positive. Hence, the condition for the possibility of the existence of multi-stable states is if:

$$g_{od} + g_{dd} = \sum_\alpha m_\alpha \left\{ \rho(\lambda_\alpha) + \sum_\beta m_\beta \ln\sin^2\left(\frac{\lambda_\alpha - \lambda_\beta}{2}\right) \right\} \leq 0 \quad (27)$$

for some combinatorial permutation of m's and $\lambda$'s.

The director field configuration is given by:

$$\rho + i\theta = \ln\frac{dw}{dz} + \sum_\alpha m_\alpha \ln\sin\left(\frac{w-\lambda_\alpha}{2}\right) + i\theta_o \quad (28)$$

and the far from the surface alignment grating and liquid crystal interface the surface behaviour of $\theta$ is:

$$\lim_{v\to\infty} \theta = -\sum_\alpha m_\alpha\left(\frac{\lambda_\alpha}{2}\right) + \theta_o \quad (29)$$

Under planar (zero twist) configuration and one elastic constant approximation, the zero volt nematoelastic can be realised as the 2 dimensional Laplace equation:

$$\frac{\partial^2 \theta}{\partial x^2} + \frac{\partial^2 \theta}{\partial y^2} = 0 \quad (30)$$

where $\theta$ is the tilt angle of the nematic director field defined in the x-y plane. The problem is analogous to the two dimensional electrostatic, where $\theta$ is the electrostatic potential.

The solution to equation 30 is:

$$\theta(w) = \text{Im}\ln\left(\frac{dz}{dw}\right) + \frac{\pi}{2} \quad (31)$$

where $z=(x+iy)$ and $w=(u+iv)$ are complex planes related by a conformal mapping such that $z(w)=x(w)+iy(w)$ is the grating surface profile when $w=u+i0$.

Solution 31 gives the homeotropic alignment at the grating surface:

$$\theta(w = u + 0i) = \text{Im}\ln\left(\frac{dx}{du} + i\frac{dy}{du}\right) + \frac{\pi}{2} \quad (32)$$

$$= \tan^{-1}\left(\frac{dy}{du} \middle/ \frac{dx}{du}\right) + \frac{\pi}{2}$$

The conformal mapping technique, z→ω, is required to be analytic in the upper half plane of ω for θ and hence the energy to be non-singular. Therefore, $$\lim_{v \to \infty} w = cz \tag{33}$$

If c is real then:

$$\lim_{v \to \infty} \theta = \lim_{v \to \infty} \mathrm{Im}\left(\frac{dz}{dw}\right) + \frac{\pi}{2} = \frac{\pi}{2} \tag{34}$$

From the solution of equation 31, one obtains the conjugate function, ρ, of θ which also satisfies the Laplace equation 30

$$\rho(w) = \mathrm{Re}\ln\left(\frac{dz}{dw}\right) = \ln\left|\frac{dz}{dw}\right| \tag{35}$$

ρ and θ can be understood as the analogues of the electric field intensity and potential in electrostatics. The lines of constants ρ and θ are orthogonal as electric lines and equipotentials are normal to one another. The mathematical meaning of ρ is the natural logarithm of the Jacobian for the conformal transformation w→z, as described by M. R Speigal, "Complex Variables", Schaum's outline series, McGraw Hill, 1974. Hence ρ measures, in the logarithmic scale, the magnitude of the rate of change of z with respect to the rate of change of w. In other words, $\rho_0$ measures, in logarithmic scale, the ratio of an elemental area, Δz, at z to its corresponding area, Δw, at w(z) under a conformal transformation z⇌w. Hence $\rho_0$ evaluated at the concave parts of a surface is bigger than $\rho_0$ at the convex parts of the surface. FIG. 4 shows the conformal co-ordinates graphically; the bold lines (24) are the constant v's and the normal lines (25) are the constant u's; points a (26), b (28) and c (30) represent the flat, convex and concave curvatures; $\rho_0$ associate with these points are ordered as $\rho_0(c) > \rho_0(a) > \rho_0(b)$ By means of a conformal transformation, Cauchy-Riemann condition and change of integration variables, the deformation energy per unit surface area per unit groove, g, can be expressed in the three different ways as follows:

$$g_0 = \frac{K}{2L} \int\int dx\,dy \left\{ \left(\frac{\partial \theta}{\partial x}\right)^2 + \left(\frac{\partial \theta}{\partial y}\right)^2 \right\} \tag{36a}$$

$$= \frac{K}{2L} \int_0^\infty dv \int_0^L du \left\{ \frac{\partial \rho}{\partial u}\frac{\partial \theta}{\partial v} - \frac{\partial \rho}{\partial v}\frac{\partial \theta}{\partial u} \right\} \tag{36b}$$

$$= \frac{K}{2L} \int\int d\rho\,d\theta \tag{36c}$$

where L is the pitch of the groove of a given grating and $K = K_{11} = K_{22} = K_{33}$ is the elastic constant.

Point singularities can be added to the solution of equation 31 without altering the boundary condition requirement of homeotropic surface condition of equation 32. For a periodic grating surface, we consider an array of singularities on the surface. Hence, the tilt angle, θ, of the director field becomes:

$$\theta = \mathrm{Im}\ln\left(\frac{dz}{dw}\right) + \frac{\pi}{2} + \mathrm{Im}\sum_\alpha^N \sum_{n=-\infty}^\infty m_\alpha \ln(w - \lambda_\alpha - 2\pi n) \tag{37}$$

where $m_\alpha$ and N are half integers representing the strength of the N nematic disclinations on a single groove of the grating surface, $\lambda_\alpha$ are N real numbers defined in the range (-π, π) representing the positions (w=u+i0) of the $m_\alpha$ disclinations in the $0^{th}$ groove of the grating. In the transformed w plane, the periodicity of the groove is conveniently scaled to 2π. The logarithmic functions in the summation in equation 37 are analogues of the well known functions for line charges of strength $m_\alpha$ in two dimensional electrostatics.

Upon summing the infinite series in equation 37, on yields:

$$\rho + i\theta = \ln\frac{dw}{dz} + \sum_\alpha^N m_\alpha \ln\sin\left(\frac{w - \lambda_\alpha}{2}\right) + i\frac{\pi}{2} \tag{38}$$

The deformation energy for θ given solution 38 is:

$$g_d = g_o + \frac{\pi k}{2L}\left\{ \sum_\alpha^N m_\alpha \rho(\lambda_\alpha) + \sum_{\alpha,\beta}^N m_\alpha m_\beta \ln\left[\sin^2\left(\frac{\lambda_\alpha - \lambda_\beta}{2}\right)\right] \right\} \tag{39}$$

The expression is valid for $$\sum_\alpha m_\alpha = 0.$$

Otherwise, g will increase linearly with the system height. In the second summation, $$|\lambda_\alpha - \lambda_\beta|$$

is defined to be r when α=β. r<<L is the diameter of the disclination cores.

The second summation in equation 38 is always positive. The condition for the possibilities of multi-stable states is given by:

$$\sum_\alpha^N m_\alpha \rho(\lambda_\alpha) + \sum_{\alpha,\beta}^N m_\alpha m_\beta \ln\left[\sin^2\left(\frac{\lambda_\alpha - \lambda_\beta}{2}\right)\right] \le 0 \tag{40}$$

for some configuration disclination lines on the grating position at $\lambda_\alpha$'s.

To minimise the first summation, the following criteria are observed:

$$m_\alpha > 0 \Leftrightarrow \rho(\lambda_\alpha) = \min(\rho(\lambda)) \tag{41a}$$

$$m_\alpha < 0 \Leftrightarrow \rho(\lambda_\alpha) = \max(\rho(\lambda)) \tag{41b}$$

It concludes that a positive indexed disclination ($m_\alpha > 0$) tends to form at the position on a grating where the curvature is convex ($\rho < c$) and a negative index disclination ($m_\alpha < 0$) tends to form at the position with a concave curvature ($\rho > c$).

For a given set of $\lambda_\alpha$'s, the tilt angle of the director field at a distance far from the grating surface can be found from equation 38 for $\theta$ by taking the limit of v to infinity:

$$\lim_{v \to \infty} \theta = -\sum_\alpha^N m_\alpha \left(\frac{\lambda_\alpha}{2}\right) + \frac{\pi}{2} \qquad (42)$$

Implementation of this theory, allows the energy associated with a particular position of a pair of +½ and −½ defects, and the pretilt imparted to the liquid crystal at an infinite distance from the surface, to be calculated for an arbitrary grating shape. An arbitrary grating shape is input into the model and the energy is calculated as a function of both −½ defect position along the grating and +½ defect position along the grating. At points where the −½ defect is coincident with the −½ defect, the defects annihilate and the non-defect state is formed.

FIG. 5 shows a series of gratings and a representation of a cross-section through the energy profile. The energy profile is obtained as a function of both −½ defect position and +½ defect position on the grating, producing a three dimensional energy profile. FIGS. 5b, 5d, and 5f show a cross section of this profile (in each case the same profile).

Figure 5A:
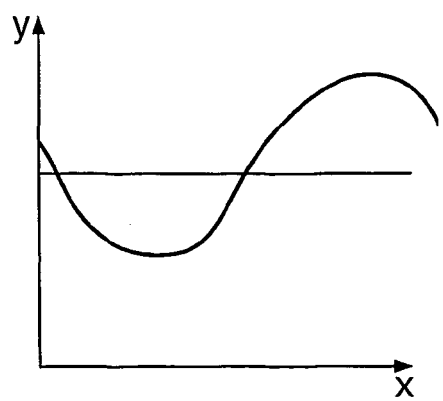
FIG. 5 shows various grating profiles and the, calculated energy of the various states.
Figure 5B:
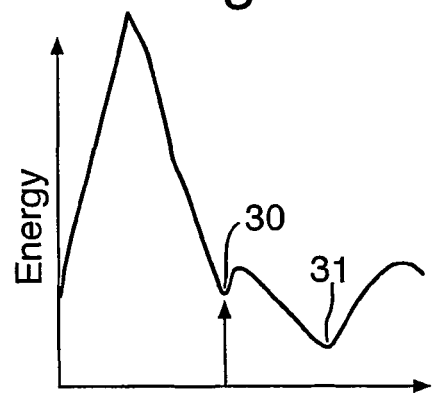

FIG. 5a represents a symmetrical sinusoidal grating. It can be seen that two energy minima occur (30, 31). The first energy minimum (30) is associated with coincident −½ and +½ defect positions (i.e. the non-defect state) has a calculated pretilt of 90°. The second energy minimum (31) is associated with the +½ defect being at the convex defect site and the −½ defect being at the concave defect site; this gives a pretilt of 0°.

Figure 5C:
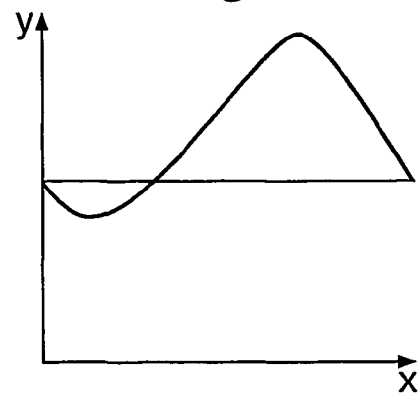
Figure 5D:
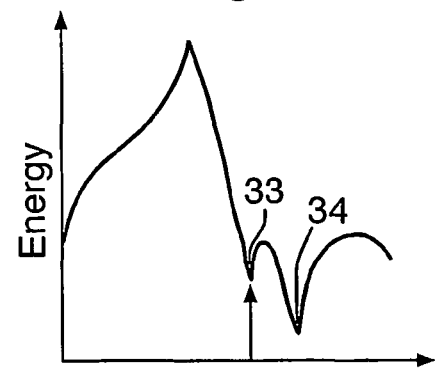

FIG. 5c represents an asymmetric sinusoidal grating. It can be seen that two energy minima occur (33, 34). The first energy minimum (33) is associated with coincident −½ and +½ defect positions (i.e. the non-defect state) has a calculated pretilt of 90°. The second energy minimum (34) is associated with the +½ defect being at the convex defect site and the −½ defect being at the concave defect site; this gives a pretilt of 36°. Hence, as found for the simple model above, an asymmetric grating with defect sites not fulfilling the criteria a=L/2 produces a finite pretilt.

Figure 5E:
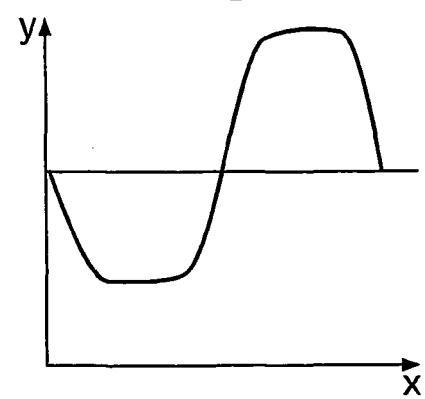
Figure 5F:
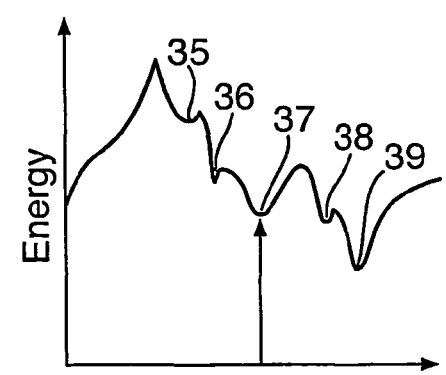

FIG. 5e represents an asymmetric square grating with four defect sites. It can be seen that five energy minima occur (35, 36, 37, 38, 39). The energy minimum (37) is associated with coincident −½ and +½ defect positions (i.e. the non-defect state) has a calculated pretilt of 90°. The other four energy minima (35, 36, 38, 39) are associated with the various combinations of +½ defect and −½ defect positions as described with reference to 7. The energy minimum (39) gives a pretilt of 0°.

To summarise, it can be seen that a computer implementation of the above model allows the surface pretilt induced by a surface alignment grating, and the energy associated with that particular configuration, to be calculated from a particular defect pair position on a given surface alignment grating profile.

Multiple Zenithally Stable States and the Associated Surface Pretilt.

The model described above with reference to FIGS. 4 and 5 demonstrates that for a given surface profile it is possible to obtain a plurality of stable surface states, and allows the pretilt associated with such states to be calculated. Such multi-stability is found within one period of the grating when there are three or more defect sites and at least one defect site has a maximum curvature which is convex and at least one defect site has a maximum radius of curvature which is concave.

A plurality of defect sites per unit length of grating allows the formation of defect pairs at a plurality of positions within a single grating period. It is only possible for +½ and −½ defects to form in pairs; a single defect, or two −½ defects, can not form alone. Each +½ and −½ defect pair position induces a liquid crystal pretilt that could be calculated rigorously using the model described with reference to FIGS. 4 and 5 above, or less rigorously using the simple model described with reference to FIGS. 1 to 3 above.

A plurality of defect sites per grating period, the formation of defect pair combinations and the pretilt associated with the various defect site configurations will now be described with reference to FIGS. 6 to 9.

Figure 6A:
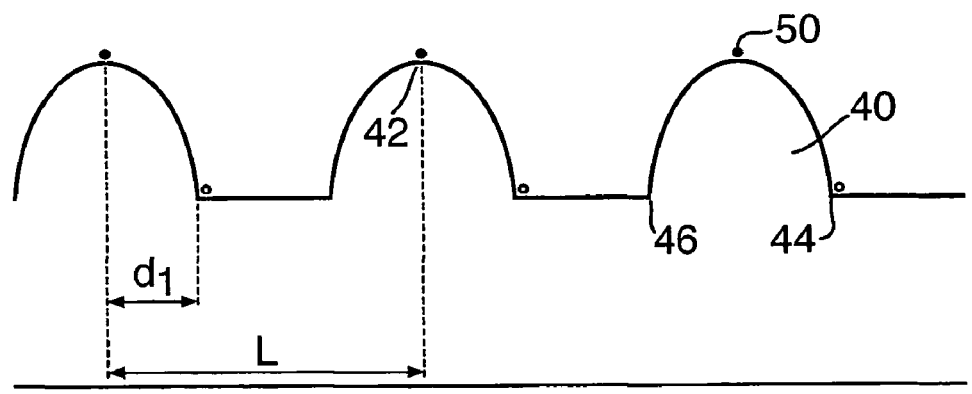
FIG. 6 shows a cross section of a symmetric grating surface with three defects sites per unit length.
Figure 6B:
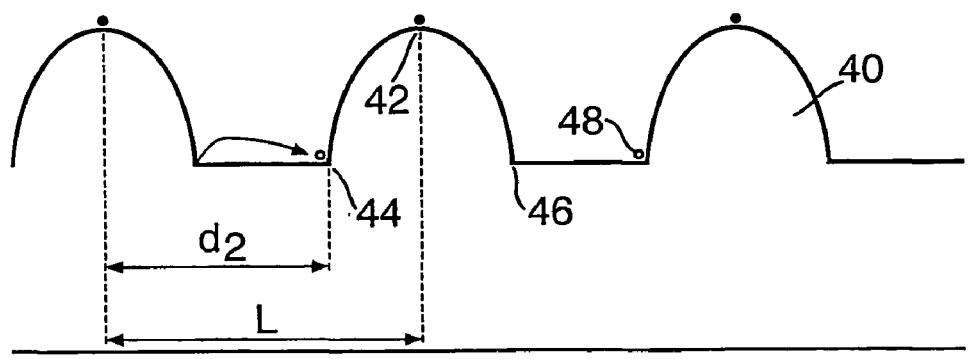
Figure 7A:
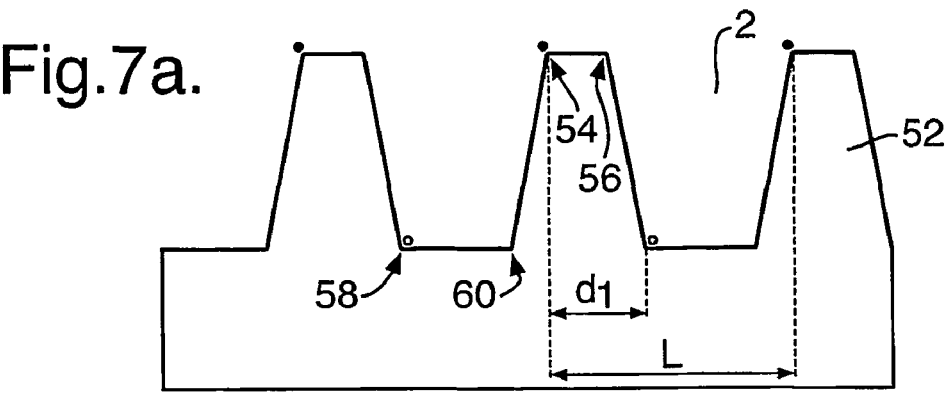
FIG. 7 shows a cross section of a symmetric grating surface with four defect sites per unit length.
Figure 7B:
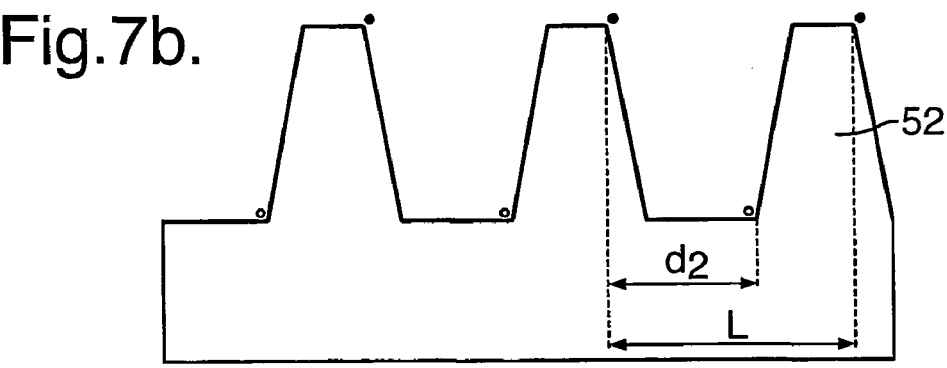
Figure 7C:
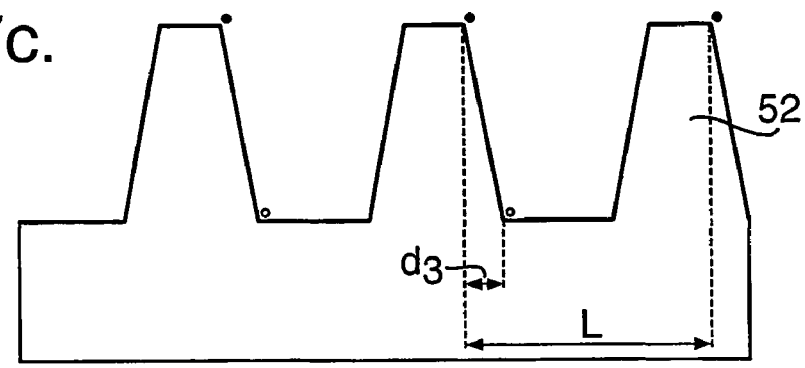
Figure 7D:
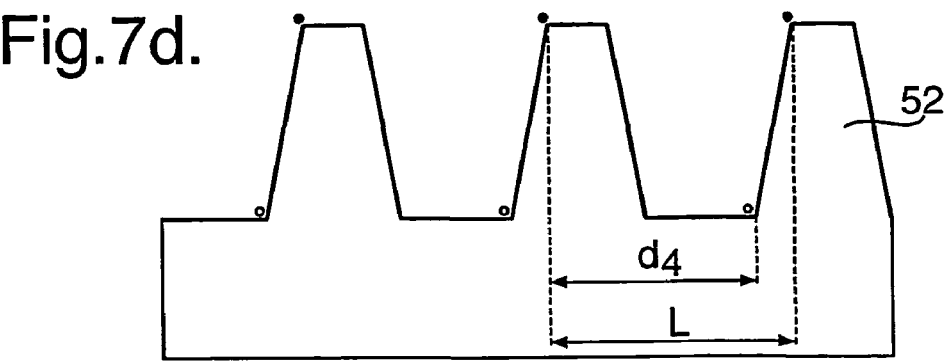

FIG. 6 depicts a surface alignment grating (40) with a single +½ defect site (42) per grating period, L. The surface alignment grating has two possible −½ defect sites per grating period; a first −½ defect site (44) and a second −½ defect site (46). Two possible defect states could then be formed with a +½ defect at the +½ defect site (42) and a −½ defect at either the first −½ defect site (44) or the second −½ defect site (46). These two possible defect pair configurations are shown in FIGS. 6a and 6b, where representative −½ defects (48) and +½ defects (50) are also shown.

The symmetric grating of FIG. 6 can produce two possible pre-tilt angles $\theta_1 = \pi d_1/L$ (for the configuration of FIG. 6a) and $\theta_2 = \pi d_2/L$ (for the configuration of FIG. 6b), which are finite but symmetrical about the substrate normal. A non-defect configuration can also be adopted by the nematic liquid crystal at the grating surface. The surface alignment grating of FIG. 6 thus provides three (two defect and a non-defect) stable surface pretilt configurations.

Referring to FIG. 7, there exists on the surface alignment grating (52) a first +½ defect site (54), a second +½ defect site (56), a first −½ defect site (58) and a second −½ defect site (60). Liquid crystal (2) in contact with the surface alignment grating (52) could adopt any one of four possible defect configurations, as shown in FIGS. 7a, 7b, 7c and 7d. The defect pair configurations shown in FIGS. 7a, 7b, 7c and 7d will induce surface pretilts of $\theta_1$, $\theta_2$, $\theta_3$ and $\theta_4$ respectively. The surface pretilt angles $\theta_1$, $\theta_2$, $\theta_3$ and $\theta_4$ can be estimated using equation 17 from the ratios of distances $d_1$, $d_2$, $d_3$, $d_4$ to L.

For a symmetric grating of the type shown in FIG. 7, the surface pretilt angles $\theta_1$ and $\theta_2$ occupy angles which are complimentary, and are therefore symmetric about the substrate normal. The same is true for $\theta_3$ and $\theta_4$. In practice the $\theta_1$ and $\theta_2$ states have the lower energy configuration since the high average surface tilt possessed by $\theta_3$ and $\theta_4$ can be more readily attained by adopting the non-defect high tilt configuration. Equivalent but opposite pretilts may also have advantages, such as wider viewing angle (similar to dual domain TN).

Referring to FIG. 8, it is possible for a symmetric or an asymmetric grating to have a surface profile such that a certain combination, or certain combinations, of +½ defect sites and −½ defect sites will fulfil the zero pretilt criteria of equation 17 thus producing one or more defect states of zero surface pretilt (i.e. d=L/2).

Figure 8A:
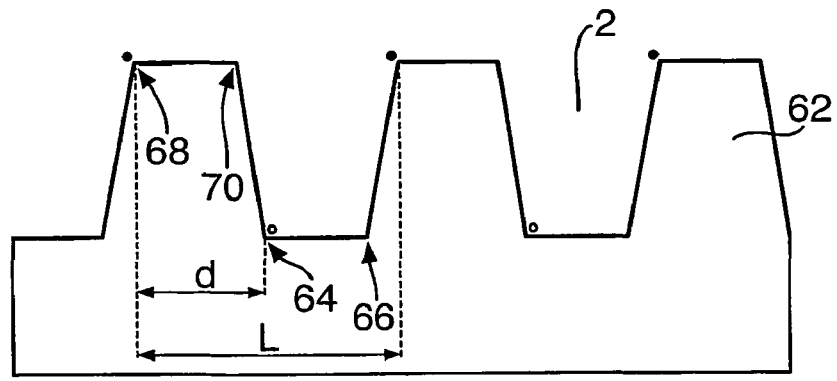
FIG. 8 shows a cross section of a a) symmetric and b) an asymmetric grating surface having at least one substantially zero pretilt alignment state.

FIG. 8a shows a symmetric alignment grating (62) which has four defect sites per unit length; a first −½ defect site (64), a second −½ defect site (66), a first +½ defect site (68) and a second +½ defect site (70). If a −½ defect forms at the first −½ defect site (64) and a +½ defect forms at the first +½ defect site (68), the criteria L=2d is fulfilled and the defect state will impart a zero pretilt to the liquid crystal (2) in contact with the grating surface (62). Similarly, zero pretilt is imparted to the liquid crystal (2) by the surface alignment grating (62) if a −½ defect forms at the second −½ defect site (66) and a +½ defect forms at the second +½ defect site (70). The two other possible combinations of the −½ and +½ defect position will impart a non-zero surface pretilt to the liquid crystal layer (2) according to equation 17.

Figure 8B:
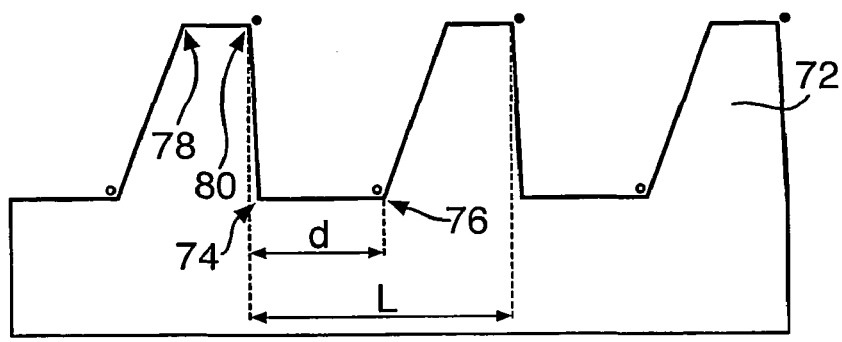

FIG. 8b shows an asymmetric alignment grating (72) which has four defect sites per unit length; a first −½ defect site (74), a second −½ defect site (76), a first +½ defect site (78) and a second +½ defect site (80). If a −½ defect forms at the second −½ defect site (76) and a +½ defect forms at the second +½ defect site (80), the criteria L=2d is fulfilled and, when this particular defect state is formed, the grating surface (72) imparts a zero pretilt to the liquid crystal (2). The three other possible combinations of the −½ and +½ defect position will impart a non-zero surface pretilt to the liquid crystal layer (2) according to equation 17. Note that although there are four defect sites in this example, they alternate convex, convex, concave, concave and therefore an additional defect pair cannot be created.

Each of the five possible states that may form on the symmetric alignment grating of FIG. 8a, or the asymmetric grating of FIG. 8b, will induce a certain liquid crystal surface pretilt angle and will have correspondingly different energies. The lower energy configurations will be those which induce the lower pretilt angles. If an asymmetric grating was so profiled, with an appropriate groove depth and pitch, the energy of one or more of the defect states could be made such that those defect states are less energetically favourable than the non-defect state and some or all of the other defect states.

Surface grating structures can be designed, using the models and examples described above, where the defect sites are positioned so as to induce a plurality of states of various different energies, and/or where the surface pretilt of one or more of the defect states is to be controlled (for example to get defect states which induces substantially zero pretilt).

Figure 9:
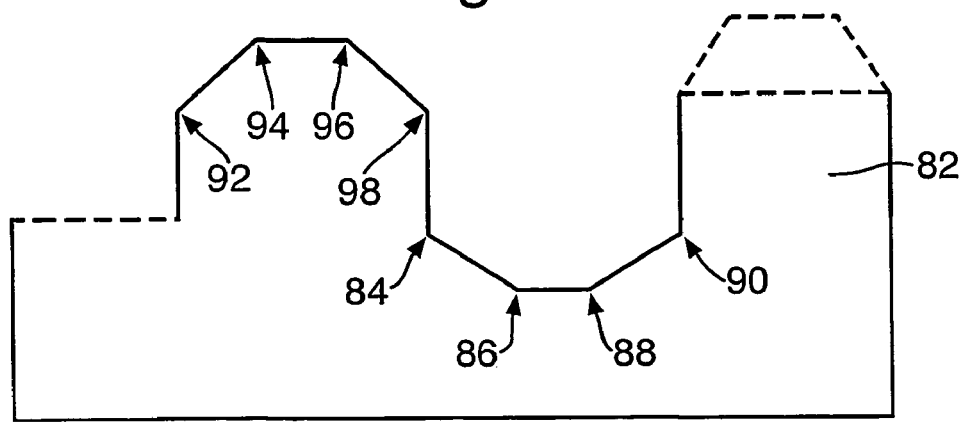
FIG. 9 shows a cross section of a grating surface with 8 defect sites per unit length.

The construction of multi-faceted gratings is limited only by the fabrication process. However it is unlikely that a grating with more than approximately 10 defect sites per grating period would be required. FIG. 9 shows an alignment grating (82) with four −½ defect sites (84, 86, 88, 90) per unit length and four +½ defect sites (92, 94, 96, 98) per unit length. In addition to the non-defect (homeotropic) state, the alignment grating structure (82) would enable sixteen defect state configurations to be formed. No more than one pair of defect can form a defect state on this surface; to do so requires alternating +½ and −½ defect sites. The surface pretilt imparted to the liquid crystal by each of the defect states is defined by equation 17, and could also be calculated using the more rigorous model described above with reference to FIGS. 4 and 5.

Surface alignment gratings may be profiled so as to favour the formation of more than one pair of +½ and −½ defects per unit length of grating, by producing structures with alternating +½ and −½ defect sites.

An example of a surface alignment grating, profiled so as to favour the formation of more than one pair of +½ and −½ defects per unit length of grating, will now be described with reference to FIG. 10. The alignment imparted to a nematic liquid crystal layer by the type of grating structures described with reference to FIG. 10 will then be described with reference to FIGS. 11 to 12.

A blazed surface alignment grating (100) of pitch P and amplitude A is shown in FIG. 10a, and may be described by the function:

$$y(x) = fn1(x) = \frac{A}{2}\sin\left(\frac{2\pi x}{p} + \delta\sin\left(\frac{2\pi x}{p}\right)\right) \quad (43)$$

where: A=half of the peak to peak amplitude of the grooves
p=period or pitch of the grooves
δ=the asymmetry of the function (δ=0 gives a sinusoidal function and δ>0 gives a blazed asymmetric profile).

Within an overall period p, it is possible to have two or more sub-periods which are, for example, of pitch $p_1$ and $p_2$ and of amplitude $A_1$ and $A_2$. Such surface profiles will now be described for the sinusoidal function fn1(x), described by equation 43 above, with reference to FIGS. 10b to 10d. The technique of building up an overall surface alignment grating of period p from two smaller sub-units of a smaller pitch and/or of different amplitudes is not restricted to sinusoidal functions of the form described herein but may also be applied to a plurality of sub-units provided that the condition $p_1+p_2 \ldots +p_n=p$ is met.

FIG. 10b shows a surface alignment grating (102) made up of one sub-period of fn1(x) (given in equation 43) with pitch $p_1$ and amplitude A, plus one sub-period of fn1(x) with pitch $p_2$ and amplitude A, such that $p=p_1+p_2$. In FIG. 10b, $p_2>p_1$. FIG. 10c shows a surface alignment grating (103) profiled such that one period p of the grooved surface is made up of one sub-period of the function fn1(x) with pitch p/2 and amplitude $A_1$ plus one sub-period of the function fn1(x) with pitch p/2 and amplitude $A_2$. FIG. 10d shows a surface alignment grating (120) profiled such that one period p of the grooved surface is made up of one period of the function fn1(x) with pitch $p_1$ and amplitude $A_1$ plus one period of the function fn1(x) with pitch $p_2$ and amplitude $A_2$.

The surface alignment grating structure (102) given in FIG. 10b, when in contact with a nematic liquid crystal (2) is depicted in FIG. 11. The nematic liquid crystal director, n, is perpendicular to the iso-contour lines (101). From FIG. 11, it can be seen that the surface alignment grating structure (102) has a first (104) and second (106) +½ defect site and a first (108) and second (110) −½ defect site. A non-defect, homeotropic, state is depicted in FIG. 11a.

In FIG. 11b, a +½ defect (112) forms at the first +½ defect site (104) and a −½ defect (114) forms at the first −½ defect site (108), giving an intermediate pretilt state governed by the relative position of the defect pair according to equation 17 as described above.

In FIG. 11c, a +½ defect (112) forms at the first +½ defect site (104) and a −½ defect (114) forms at the first −½ defect site (108) and in addition a second +½ defect (116) forms at the second +½ defect site (106) and a second −½ defect (118) forms at second −½ defect site (110). The formation of the two defect pairs per unit length of grating will produce a low surface pretilt state wherein the pretilt adopted by the liquid crystal a short distance, compared with the cell gap, from the grating surface (102) will be the average of that expected (from equation 17 above) for the defect states of a grating of pitch $p_1$ and a grating of pitch $p_2$. The different grating profiles of the portion of the grating of pitch $p_1$ and the portion of the grating of pitch $p_2$ causes the first and second defect pairs to have different energies associated with their formation. The energy associated with a defect pair on a grating surface can be calculated using the detailed model of grating induced surface pretilt described above with reference to FIGS. 4 and 5. Qualitatively, it can be seen that the different groove depth (A) to pitch (p) ratio of the two sub-components of the surface alignment grating (102) will be different, and consequently that the energy associated with the formation of defect pairs on the two sub-components of the surface alignment grating (102) will also differ.

In summary, it can be seen from FIG. 11 that there are three possible configurations, each producing a different surface pretilt angle, that are adopted when two pairs of defects form on two sub-periods of a grating; namely a non-defect, a single defect pair state and a dual defect pair state. The single defect pair state could give rise to other variants, but these are less likely to occur because the energy of formation associated with sharp facets is significantly different to that associated with the shallower facets.

Figure 12A:
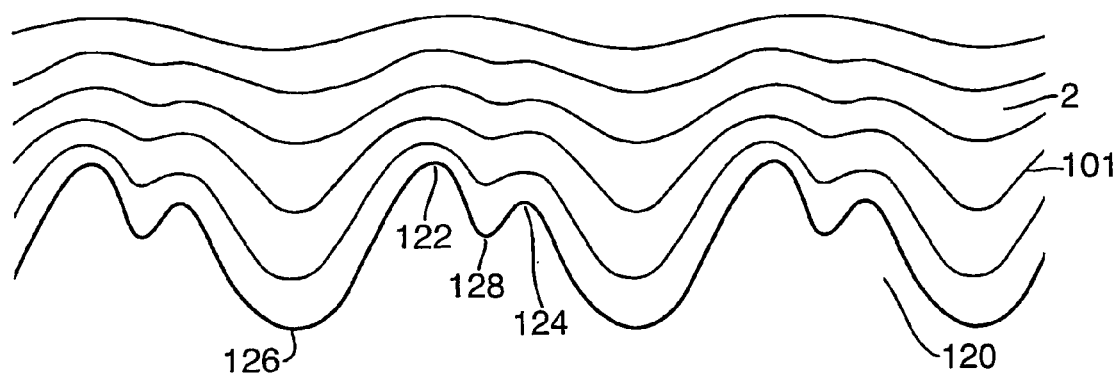

The surface alignment grating structure (120) given in FIG. 10d, when in contact with a nematic liquid crystal (2) is depicted in FIG. 12. Referring to FIG. 12, it can be seen that a similar behaviour to that described with reference to FIG. 11 is obtained with a surface alignment grating (120) of an overall period p that consists of two sub-periods $p_1$ and $p_2$ with corresponding amplitudes $A_1$ and $A_2$. The surface alignment grating (120) has a first (122) and second (124) +½ defect site and a first (126) and second (128) −½ defect site. A non-defect, homeotropic, state is depicted in FIG. 12a.

Figure 12B:
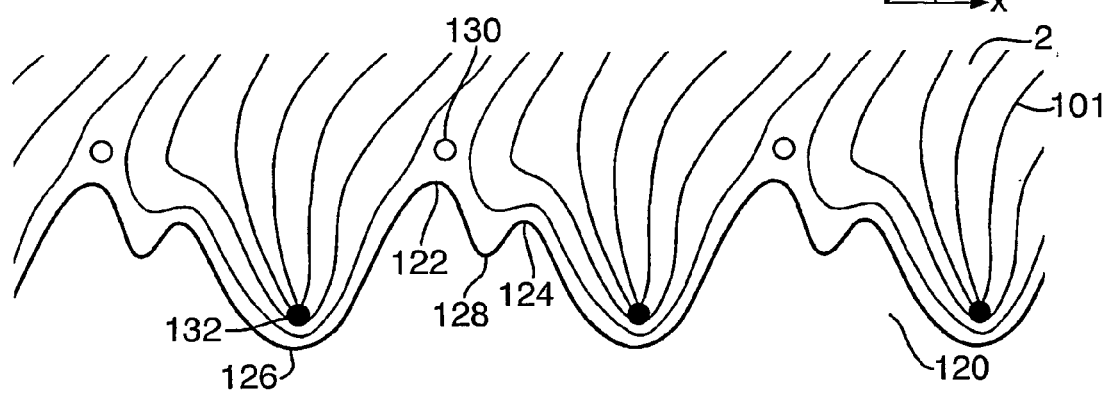
Figure 12C:
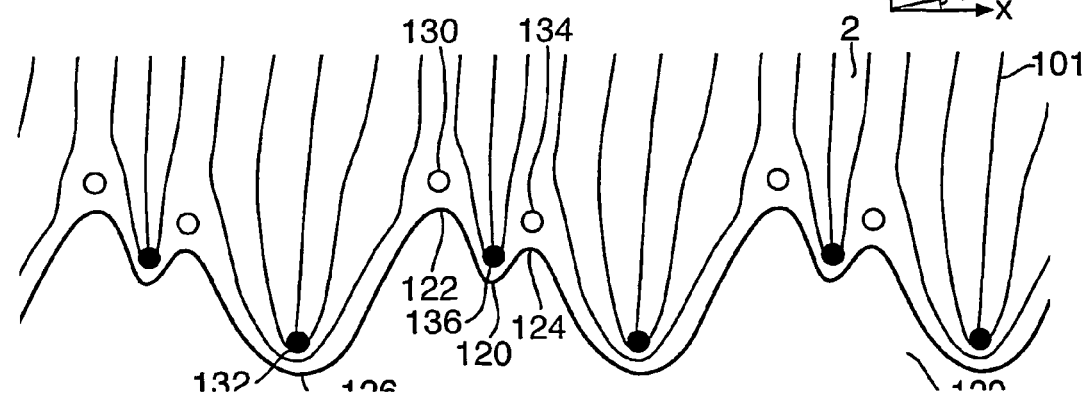

From FIG. 12b a defect state is shown where a first +½ defect (130) forms at the first +½ defect site (122) and a first −½ defect (132) forms at the first −½ defect site (126), giving an intermediate pretilt state governed by the relative position of the defect pair according to equation 17 as described above. FIG. 12c depicts a defect state wherein two defect pairs have formed; a first +½ defect (130) at the first +½ defect site (122), a first −½ defect (132) at the first −½ defect site (126), a second +½ defect (134) at the second +½ defect site (124) and a second −½ defect (136) at the second −½ defect site (128). As described with reference to FIG. 11 above, the pretilt associated with the defect state of FIG. 12b is governed by equation 17 whereas the pretilt associated with the defect pair state of FIG. 12c can be calculated by determining the average pretilt of two gratings of pitches $p_1$ and $p_2$. The energy associated with each defect pair can, as described with reference to FIG. 11 above, be determined using the model described herein with reference to FIG. 4 and 5.

To summarise, the surface alignment grating of period P described with reference to FIG. 12 above contains two distinct sub-period regions. The difference in defect energy associated with each of the sub-periods means that it is possible for stable states to form with no defects, one defect pair or two defect pairs. Each of these states will produce a different surface pretilt, allowing a tri-stable device to be readily constructed from such a surface alignment grating As described above with reference to FIG. 10 to 12, a grating consist of a number of sub-periods. It is also possible for each sub-period to possess more than two defects sites, thereby combining the structures described in FIGS. 6 to 9 in the manner described with respect to FIGS. 10 to 12.

To achieve multi-stability, i.e. a surface alignment grating which imparts three or more stable pretilt angles in the same azimuthal plane to the liquid crystal in the vicinity of the surface, when more than one pair of defects form per unit length of grating requires the overall grating period p to be less that half of the gap between the upper and lower cell walls. If the overall pitch p is more than approximately half the cell gap, defect pairs associated with adjacent sub-unit grating periods contained within the overall grating period will induce a surface pretilt that does not, in the vicinity of the surface, combine so as to form a plurality of stable pretilt angles in the same azimuthal plane. If the overall pitch p is more than approximately half the cell gap and, for example, two defect pairs per grating period could form, the surface pretilt associated with each defect pair would not merge within a short distance of the surface but would produce two distinct and adjacent regions of different bulk liquid crystal configuration (i.e. a striped texture when observed optically).

Although achieving a uniform pretilt within a short distance of the surface alignment grating, thereby ensuring that a uniform optical texture is attained, is ideal the formation of adjacent regions of different bulk liquid crystal configuration (thus adjacent regions of different optical appearance) is perfectly acceptable for display applications provided that the size of such regions is sufficiently small so that the separate regions can not be readily perceived by display observers.

Device Configurations.

A person skilled in the art would be aware of numerous device configurations which would allow the multi-stable surface described herein to be exploited. Several of the possible liquid crystal cell and device configurations will now be described with reference to FIG. 13.

One cell configuration which allows the existence of a plurality of stable surface pre-tilt states to be exploited as a plurality of greyscale levels is shown in cross section in a stylised form in FIG. 13. The cell is constructed from two cell walls (140,142), where the first cell wall (142) has a multi-stable surface alignment grating (144) formed on its internal surface, in this example a tri-stable surface alignment grating in accordance with the teaching described above, whilst the second cell wall (142) has is treated so as to induce hometropic alignment to the nematic liquid crystal (2).

The first (142) and second (140) cell walls are maintained typically 1–10 μm apart by a spacer ring (not shown), numerous beads of the same dimension dispersed within the liquid crystal (not shown) or numerous beads of the same dimension dispersed within any glue used to bond the cell walls together (not shown). Many other techniques of maintaining a gap between the cell walls are readily known to a person skilled in the art.

Figure 13A:
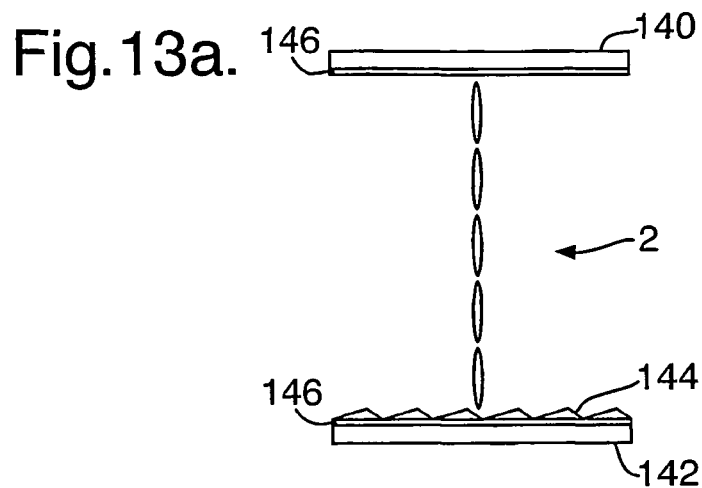
Figure 13B:
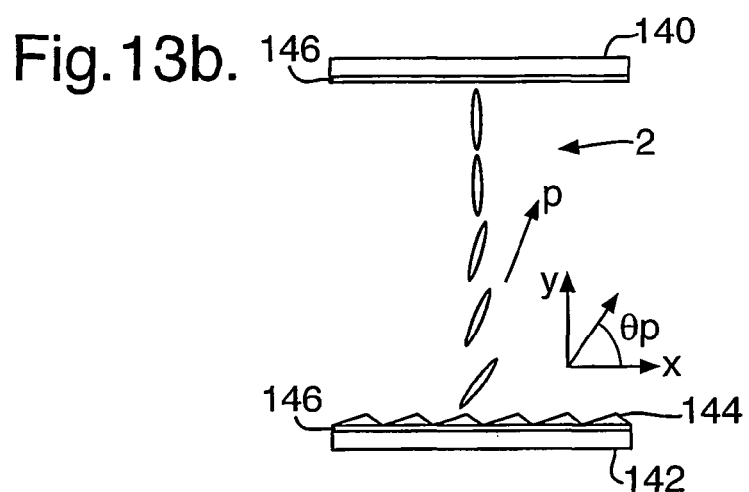
Figure 13C:
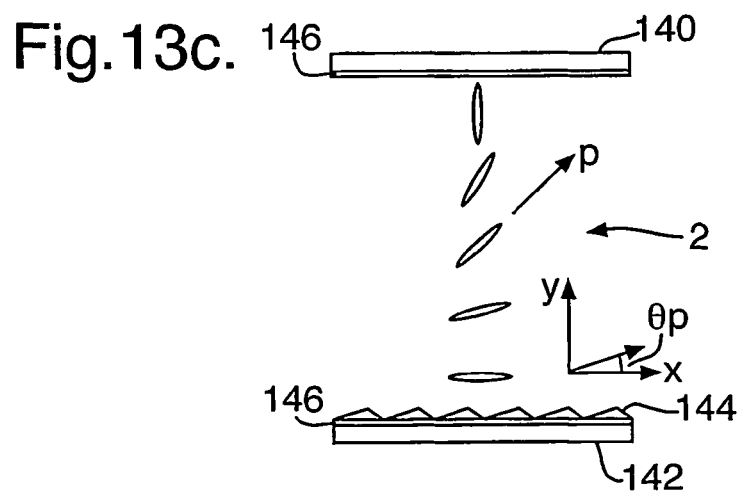

A nematic liquid crystal (2) sandwiched between the first (142) and second (140) cell walls of can exist in any of three stable configurations; the non-defect configuration shown in FIG. 13(a), the defect configuration shown in FIG. 13(b) or the defect configuration shown in FIG. 13(c). The two defect state configurations of FIGS. 13(a) and 13(b) arising from two possible positions which the bend defect can adopt on a the tri-stable surface alignment grating (144). For many nematic materials, a splay or bend deformation will lead to a macroscopic flexoelectric polarisation which is represented by the vector P in FIG. 13(b) and P' in FIG. 13(c). A dc pulse applied to the electrodes (146) can couple to this flexoelectric polarisation, which is predominantly close to the alignment surface, and depending on its sign and magnitude any one of the three configurations can be selected.

The cell configuration used to exploit the existence of a tri-stable surface alignment grating, described with reference to FIG. 13 above, will also allow multi-stable surface alignment gratings to be exploited as multi-stable devices. Maximum contrast will be achieved if one of the defect states adopts a zero pretilt configuration by having defects positioned so as to fulfil the criteria a=L/2.

To obtain a display device with optical contrast, the cell configurations described above can be combined with external polariser(s) and/or a reflector and the device may be operated in either transmissive or reflective mode. Alternatively, a dichroic dye may be mixed with the liquid crystal to get different absorption of light in the various multi-stable configurations. All these techniques of producing optical contrast from liquid crystal cell configuration are well known to a person skilled in the art.

Optical compensation techniques, which would be well known to person skilled in the art, may also be employed to enhance the optical contrast and viewing angle characteristics of any of the plurality of defect states.

Any nematic material with positive, negative or zero dielectric anisotropy may be used in the cell configuration. Dual frequency nematic materials, where the sign of dielectric anisotropy changes with the frequency of applied voltage, may also be used. In a preferred embodiment a high positive dielectric anisotropy, and associated high flexoelectric coefficient, may be used. Super-twist nematic and active matrix nematic materials would be suitable, although there is no requirement for the high ionic purity of liquid crystal required for the operation of active matrix devices.

The cell walls may be formed of a relatively thick non flexible material such as a glass, or one or both walls may be formed of a flexible material such as a thin layer of glass or a plastic flexible material e.g. polyolefin or polypropylene. A plastic cell wall may be embossed on its inner surface to provide a grating. Additionally, the embossing may provide small pillars (e.g. of 1–10 μm height and 5–50 μm or more width) for assisting in correct spacing apart of the cell walls and also for a barrier to liquid crystal material flow when the cell is flexed. Alternatively the pillars may be formed by the material of the alignment layers.

The grating may be a profiled layer of a photopolymer formed by a photolithographic process e.g. M C Huntly, Diffraction Gratings (Academic Press, London, 1982) p 95–125; and F Horn, Physics World, 33 (March 1993). Alternatively, the grating may be formed by embossing; M T Gale, J Kane and K Knop, J App. Photo Eng, 4, 2, 41 (1978), or ruling; E G Loewen and R S Wiley, Proc SPIE, 88 (1987), or by transfer from a carrier layer. A grating of 0.2 μm to 5 μm pitch, with a groove depth of between 0.1 μm to 3 μm is preferred.

Experimental examples, to backup the theoretical analysis described above, will now be described with reference to FIGS. 14 to 22.

EXAMPLE 1

It will now be shown, with reference to FIG. 14, how a symmetrical grating structure with only one pair of defect sites per grating unit length induces a liquid crystal surface pretilt of approximately zero degrees.

A solution comprising 4 parts 1813 Shipley photoresist to one part PGMEA thinners was spun onto an Indium Tin Oxide (ITO) coated substrate producing a photoresist film thickness of approximately 0.8 μm. Holographic interference of two beams was used to create a grating of 500 nm pitch with a profile very close to being sinusoidal. The substrate was then developed to reveal the grating structure which was then hardened by exposure to light from a high intensity 254 nm light source, followed by a hard-bake at 180° C. which rendered the grating insoluble in liquid crystal material. The grating used for the experiment above was analysed, after performing the above experiments, using cross-sectional SEM and the grating profile is shown in FIG. 14.

The grating was treated with a homeotropic surfactant and assembled into a 10 μm cell opposite a planar anchoring grating which had been made by photolithography. After filling with liquid crystal and cooling into the nematic phase, only one state was observed. No degeneracy was present in this cell which immediately suggests a pretilt of zero. The pretilt of the bistable grating surface was measured, using the rotating crystal method to be 0.2°.

EXAMPLE 2

It will now be shown, with reference to FIGS. 15 and 16, how a symmetrical grating structure with two +½ defect sites and one −½ defect site per grating unit length will induces two liquid crystal defect configurations with surface pretilts significantly greater than zero degrees.

A solution comprising 4 parts 1813 Shipley photoresist to one part PGMEA thinners was spun onto an ITO coated substrate producing a photoresist film thickness of approximately 0.8 μm. A 1 μm pitch chrome-on-glass master-grating was bolted down so that it sat in intimate contact with the photoresist coated substrate. The assembly was exposed at normal incidence to a well-collimated beam of light from a high power mercury lamp. A variable neutral density filter was put between the light source and the master grating so that a variable exposure was made in the direction of the grating grooves. The substrate was then unclamped and developed to reveal a grating structure which was then hardened by exposure to light from an high intensity 254 nm source, followed by a hard-bake at 180° C. which rendered the grating insoluble in liquid crystal material. A homeotropic surface treatment was applied. A grating made in this way which exhibited similar tilt angles in the low tilt configuration was snapped along the direction perpendicular to the grating grooves and characterised using SEM. The resulting photograph shown in FIG. 15 is a cross section of the grating profile.

This symmetrical grating with normal boundary conditions was assembled opposite a second symmetrical grating which had been made using an identical method, but which was not given the homeotropic anchoring treatment or the variable exposure. The grating grooves were assembled perpendicular to each other with a cell spacing of approximately 10 μm. The cell was capillary-filled with liquid crystal and on cooling from the isotropic phase adopted an alignment configuration along the grating grooves of the planar anchored grating. The configuration at the surface alignment grating surface was determined by the depth of the grating which resulted from the variable exposure.

At the shallow end of the surface alignment grating a degenerate hybrid aligned configuration was realised which corresponded to formation of the high surface tilt non-defect state. However most of the cell took up low tilt configurations, which were highly degenerate with tilt disclination lines between two states of equal birefringence. The mere presence of this degeneracy confirms that some surface tilt is obtained from the surface alignment grating since there is no mechanism for the existence of surface tilt on the planar grating.

To measure the surface pretilt of one of the two stable defect states, the cell was heated to the isotropic phase and then cooled under a magnetic field which allowed a monodomain possessing only one sign of tilt to form. The average bulk tilt was measured in the cell using the rotating crystal method, and the results obtained were doubled to give the surface tilt on the surface alignment grating. The measured tilt angle, as a function of grating exposure intensity (and hence groove depth), are given in FIG. 16. A pretilt substantially greater than zero is observed for this symmetric grating, as would be predicted from the models described above.

EXAMPLE 3

As described herein, it is possible for particular grating groove designs to allow two different liquid crystal alignment configurations which contain defects as well as the non-defect state. An example of such a tri-stable surface is now described with reference to FIGS. 17 and 18.

The grating surface was fabricated as follows. Photoresist (Shipley 1805) was spun onto a glass substrate which already contained an Indium Tin Oxide overlayer. Spinning was carried out for 30 seconds at 3000 rpm followed by a 10 minute softbake at 100° C. Next the sample was exposed to UV radiation (250 mJ/cm$^2$, 360–440 nm, incident 60° from the sample normal) with the mask in hard contact with the sample. The resist image was developed using Shipley MF319 for 10 seconds following by a water rinse. Next the grating pattern was hardened by exposing to deep UV (7.5 J/cm$^2$, 254 nm) and then baking at 180° C. for 2 hours. Finally the grating surface was processed in order to induce homeotropic alignment of the LC and a 4 μm thick cell was constructed which consisted of one grating surface and one flat surface designed to give homeotropic alignment of the LC. The cell was filled with a nematic liquid crystal material. FIG. 17 shows an SEM image of a grating made by this method. A high degree of asymmetry is observed due to the off-axis UV illumination.

Application of appropriate pulses to the cell was found to lead to three different states which are labelled ND, D1 and D2. FIG. 18 shows the schematic bulk liquid crystal (2) configuration of each of these states. A bipolar pulse (0.98 ms duration) with a negative trailing part was found to select the ND state when the amplitude was above 8.8 V (polarity defined with respect to the grating surface). Bipolar pulses with a positive trailing part selected the D1 state above 11.9 V and the D2 state above 22.0 V.

The relative optical transmission of the three states was also measured with the cell between crossed polarisers oriented at ±45° to the grating grooves. It was found that the ND state transmission (Arb. Units) was 0.008, the D1 transmission was 0.103 (Arb. Units) and the D2 transmission was 0.497 (Arb. Units). In this example the intermediate D1 state has a brightness of about 20% of the D2 state. The relative brightnesses of the states can be adjusted by using different grating fabrication parameters (exposure time, exposure angle, development time) to vary the profile of the grating surface.

EXAMPLE 4

As described above with reference to FIGS. 10 to 12, a grating of overall period p may be constructed from two sub-gratings of period $p_1$ and $p_2$ where $p_1+p_2=p$. A method of manufacturing such gratings, which allow a multi-stable device to be constructed, will now be described with reference to FIGS. 19 to 22

A grating mask which has alternating chrome lines (or gaps) can be used to produce a surface alignment grating with alternating groove spacing; as shown in FIG. 19.

FIG. 19a depicts a chrome mask with constant clear gaps of 0.5 μm (154) and alternate chrome lines of 0.5 μm (150) and 0.6 μm (152); termed an alternating chrome mask (148). FIG. 19b depicts a chrome mask with constant chrome lines of 0.5 μm (150) and alternate clear gaps of 0.5 μm (154) and 0.6 μm (156); termed an alternating gap mask (149).

A surface alignment grating has been fabricated using the alternating gap mask (149) of FIG. 19b. The following method was used to fabricate this device. Photoresist (Shipley 1813) was spun onto a glass substrate which already contained an Indium Tin Oxide overlayer. Spinning was carried out for 30 seconds at 4000 rpm followed by a 10 minute softbake at 100° C. Next the sample was exposed to UV radiation (150 mJ/cm$^2$, 360–440 nm, incident 8° from the sample normal) with the alternating gap mask (149) in hard contact with the sample.

The resist image was developed using Shipley MF319 for 10 seconds following by a water rinse. Next the grating pattern was hardened by exposing to deep UV (6 J/cm$^2$, 254 nm) and then baking at 180° C. for 2 hours. Finally the grating surface was post processed in order to induce homeotropic alignment of the liquid crystal and a 4 μm thick cell was constructed which consisted of one grating surface and one flat surface designed to give homeotropic alignment of the liquid crystal.

The cell was filled with a nematic liquid crystal material. FIG. 20 shows an SEM profile of a grating produced by this method. Examination of this image shows that the distance between the groove peaks alternates between 1.0 μm and 1.1 μm as defined by the photolithographic mask Three possible stable states of the liquid crystal cell were observed; the entire grating surface in the non-defect (ND) state, a single pair of defects forming per grating unit length (the D1 state) and two pairs of defects forming per unit length (the D2 state) With the optimum pulses, the D1 state was obtained uniformly across the entire sample. The ND state is selected by a bipolar waveform with a negative trailing pulse (applied to the grating surface) while the D1 and D2 states are selected by a bipolar waveform with a positive trailing pulse.

FIG. 21 shows the transmission of this cell after bipolar pulses of various voltages. In this case the bipolar pulse width was 0.98 ms. The curve clearly shows an intermediate level which is stabilised across a voltage range of about 1.5 V. In this case the transmission of the D1 state is 31% of the full D2 state but this level can be controlled by careful adjustment of grating design or the cell geometry.

Examination of the cell using polarised optical microscopy showed that the D1 state actually consisted of two regions of distinct bulk liquid crystal alignment. The two distinct alignment regions correspond to variations in liquid crystal alignment (because of the formation of the first defect pair at one pair of defect sites and the existence of no defect pair at the second pair of defect sites) between the two sub-gratings of 1.1 μm and 1.0 μm pitch. Increasing the cell gap, or reducing the grating pitch, would cause the variation of liquid crystal accross the grating surface to merge within a shorter distance from the grating surface reducing the variations in bulk liquid crystal alignment that were observed in this case. However, the existence of a striped texture on a microscopic scale is irrelevant when considering display applications because such variations can not be perceived by the display observer; only multiple grey-levels are observed.

FIG. 22 shows the switching thresholds of the three states (ND, D1 and D2) as a function of pulse width. The three curves show the no switch (first speckle) voltage, the voltage for the full D1 state and finally the voltage for full switching. The curves remain parallel across a wide frequency range. In this case the partial switch width from ND to D1 is 7.6% while from D1 to D2 it is 8.8%.

It was noted for this cell that the D2 state was not obtained for pulses longer than 1 ms (half width). For a 2 ms pulse, a complete D1 state was obtained across the voltage range of 31.2–56.1 volts above which some over-switching occurred. This provides an additional method (pulse width modulation) of accurately selecting the D1 state.

Referring to FIG. 23, additional advantages of obtaining greyscale using a multi-stable device of the present invention, rather than relying on the prior art techniques, become apparent.

Figure 23A:
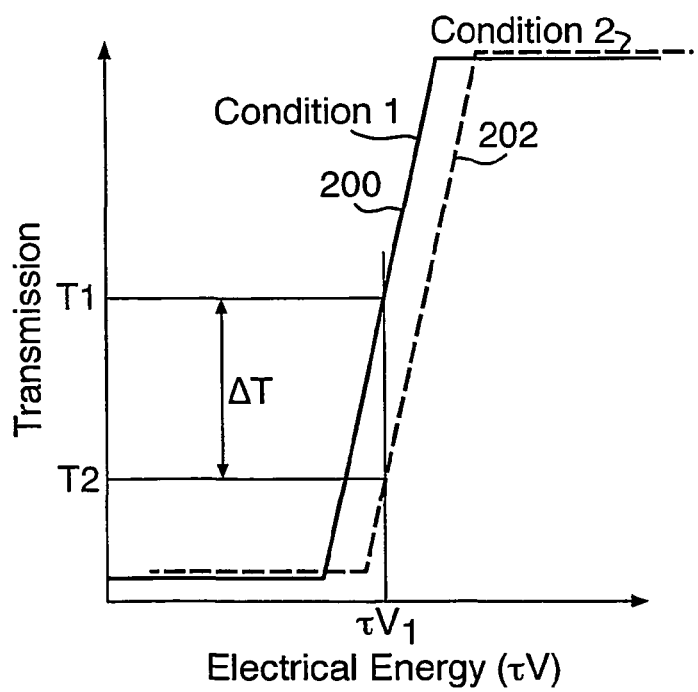

FIG. 23a shows the typical optical transmission versus applied electrical energy characteristics of a bistable device; hereinafter the term electrical energy means the duration of the switching pulse multiplied by its voltage. The first curve (200) represents the energy versus optical transmission characteristics for switching condition 1 and the second curve (202) represents the energy versus transmission characteristics for switching condition 2. The switching conditions 1 and 2 are representative of the different switching conditions, or properties, that are typically found at different points across a device. The existence of different switching conditions across a device is known in the prior art and may arise for many reasons; for example variations in temperature, cell gap, alignment or driver circuitry.

Analogue (or domain) grey-scale techniques are known in the prior art and are described in the introduction above. Known domain grey-scale techniques involve partially switching some domains, so that different grey-levels can be formed by varying the number and/or size of the domains in that pixel. If the desired grey-level is, say, 50% transmission then a pulse of $\tau V_1$ will produce the desired transmission level (i.e. level T1 in FIG. 23a) for switching condition 1. The use of an energy pulse $\tau V_1$ for areas with the switching condition 2 will produce a significantly difference transmission (level T2 in FIG. 23a). The variation of transmission (i.e. $\Delta T$) is significant for small changes of the relative conditions because the partial switching width is usually rather narrow whilst the transmission versus applied electric energy characteristic is steep. This makes domain grey-scale very difficult to implement practically.

Figure 23B:
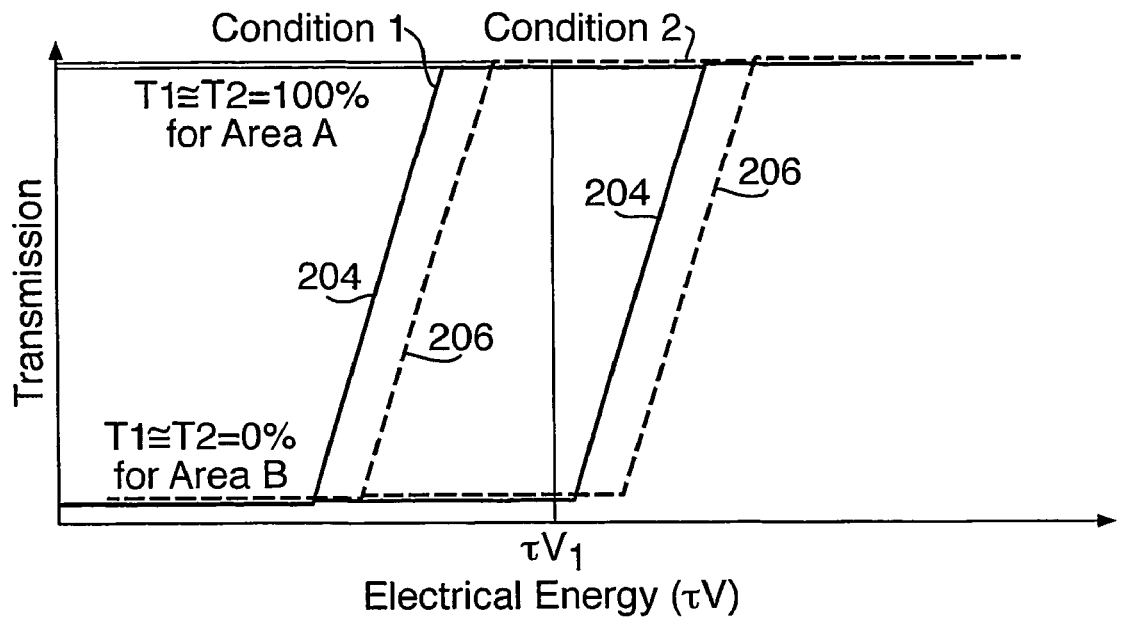

Referring to FIG. 23b, the optical transmission versus applied electrical energy characteristics of a prior art multiple threshold device is shown. Each pixel of a multiple threshold device is sub-divided into two or more areas, for example an area A and an area B. The bistable liquid crystal will respond differently applied electrical energy in each of the sub-divided pixels area because of some appropriate treatment; such as holes in electrodes, passive dielectric layers etc. Again, different switching conditions are typically present across such a device, and condition 1 is represented by the first curve (204) and condition 2 is represented by the second curve (206).

To achieve a linear grey-scale characteristic, areas A and B of each pixel would be of equal area so that when the electrical energy is sufficient to switch one area (e.g. $\tau V_1$ is applied) the resultant transmission of the pixel is 50%. In such a device, the transmission is insensitive to whether switching condition 1 or switching condition 2 is present in areas A and B. Multiple threshold techniques overcome the sensitivity to switching condition present with analogue grey-scale techniques of the type described with reference to FIG. 23a above, but dividing each pixel into areas with different switching characteristics adds substantial extra cost and complexity to the device. Moreover, it lowers the effective resolution of the device and can lead to unwanted image artefacts for certain image patterns.

Figure 23C:
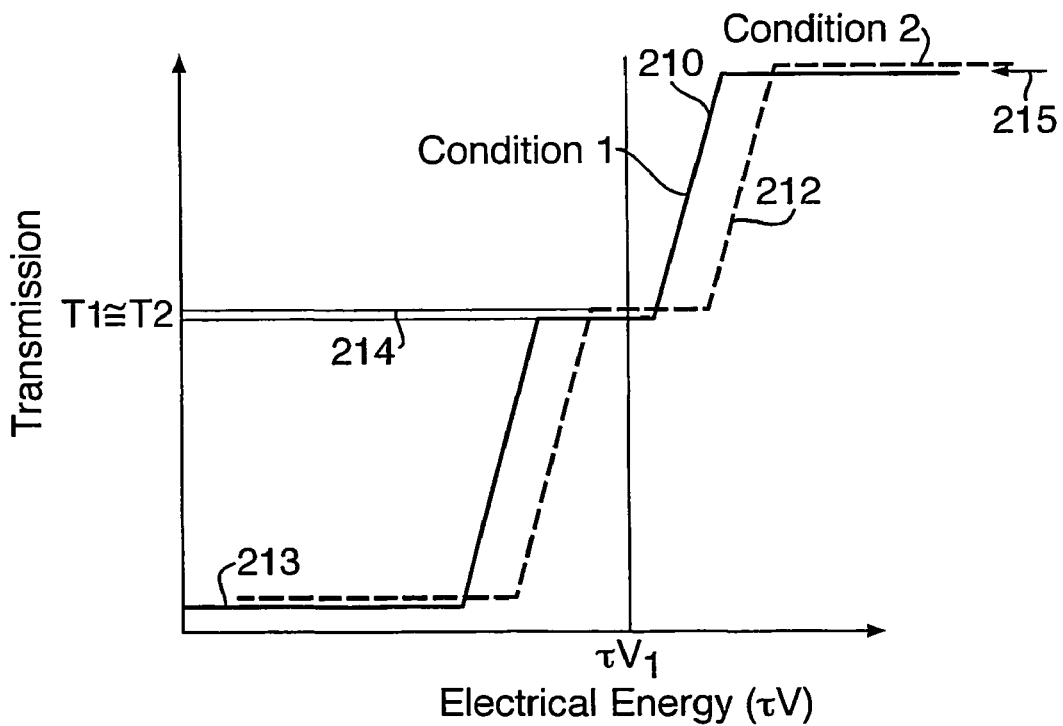

Referring to FIG. 23c, the optical transmission versus applied electrical energy characteristics of a tri-stable device is shown schematically. As described above, the liquid crystal may adopt a first stable configuration and provide a dark state transmission level (213), it may adopt a second stable configuration and provide an intermediate state transmission level (214) or it may adopt a third stable configuration and provide a light state transmission level (215). As with bistable devices, different switching conditions may be present in the device; for example switching condition 1 is represented by the first curve (210) and switching condition 2 is represented by the second curve (212).

To achieve a linear grey-scale characteristic, the second stable configuration of the tri-stable device described with reference to FIG. 23c is adapted such that it provides a 50% transmission level. It can be seen that the 50% transmission level can be selected by the application of suitable electrical energy such as $\tau V_1$. In this device, the transmission selection is insensitive to whether switching condition 1 or switching condition 2 is present in the particular pixel. As with the prior art method of using multiple thresholds, the use of three or more stable liquid crystal configuration removes greyscale errors associated with variations across the panel. However, using a device having three or more stable liquid crystal configuration avoids the cost associated with sub-pixellation and does not suffer from reduced resolution or the presence of spatial artefacts inherent in multiple threshold devices.

The invention claimed is:

1. A liquid crystal device capable of adopting at least two stable states comprising a layer of liquid crystal material located between two cell walls, a means of applying a voltage to the liquid crystal layer and a surface alignment grating on the internal surface of at least one cell wall wherein the surface profile of the surface alignment grating comprises three or more defect sites per grating period with at least one +½ defect site per grating period and at least one −½ defect site per grating period so that the liquid crystal molecules can adopt any one of two or more stable pretilt angles in the same azimuthal plane in the locality of the surface and wherein the liquid crystal device is arranged such that two or more stable liquid crystal molecular configurations can exist and wherein application of a suitable voltage causes the liquid crystal to adopt any one of two or more stable configurations.

2. A liquid crystal device of claim 1 wherein the liquid crystal molecules can adopt any one of three or more stable pretilt angles in the same azimuthal plane in the locality of the surface and wherein the arrangement is such that three or more stable liquid crystal molecular configurations can exist and wherein application of a suitable voltage causes the liquid crystal to adopt any one of three or more stable configurations.

3. A liquid crystal device as claimed in claim 1 wherein one pair of +½ and −½ defect sites are situated so as to impart a low surface pretilt for one defect state.

4. A liquid crystal device as claimed in claim 3 wherein the low surface pretilt state is of a significantly lower energy than that of any of the other possible defect states wherein only the non-defect state and the defect state of low pretilt can be readily selected on application of a voltage.

5. A liquid crystal device as claimed in claim 1 wherein the surface alignment grating structure is treated with a material that induces a homeotropic alignment of the liquid crystal director with respect to the local surface direction.

6. A liquid crystal device as claimed in claim 1 wherein the surface alignment grating structure is formed from a material that induces a homeotropic alignment of the liquid crystal director with respect to the local surface direction.

7. A liquid crystal device as claimed in claim 1 wherein the surface alignment grating structure is treated with a material that induces planar alignment of the liquid crystal director with respect to the local surface direction.

8. A liquid crystal device as claimed in claim 1 wherein the surface alignment grating structure is formed from a material that induces planar alignment of the liquid crystal director with respect to the local surface direction.

9. A liquid crystal device as claimed in claim 1 wherein the liquid crystal material is a nematic liquid crystal material.

10. A liquid crystal device as claimed in claim 9 wherein the nematic liquid crystal material has a positive dielectric anisotropy.

11. A liquid crystal device as claimed in claim 7 wherein the liquid crystal material is a nematic liquid crystal material.

12. A liquid crystal device as claimed in claim 11 wherein the nematic liquid crystal material has a negative dielectric anisotropy.

13. A liquid crystal device as claimed in claim 1 wherein one cell wall has a surface alignment grating structure and the other cell wall has a surface which induces homeotropic alignment of the liquid crystal.

14. A liquid crystal device as claimed in claim 1 wherein one cell wall has a surface alignment grating structure and the other cell wall has a surface which induces planar homogenous alignment of the liquid crystal.

15. A liquid crystal device as claimed in claim 1 wherein both cell walls have surface alignment grating structures.

16. A liquid crystal device as claimed in claim 1 wherein the pitch of the surface alignment grating structure is greater than 500 nm.

17. A liquid crystal device as claimed in claim 1 wherein the pitch of the surface alignment grating structure is greater than 800 nm.

18. A liquid crystal device as claimed in claim 1 wherein the pitch of the surface alignment grating structure is greater than 1 μm.

19. A liquid crystal device as claimed in claim 1 wherein the pitch of the surface alignment grating structure is less than 5 μm.

20. A liquid crystal device as claimed in claim 1 wherein the pitch of the surface alignment grating structure is less than 2 μm.

21. A liquid crystal device as claimed in claim 1 wherein the groove depth of the surface alignment grating structure is within the range of 0.1 μm to 3 μm.

22. A liquid crystal device as claimed in claim 1 wherein the two cell walls are separated by between 1–20 μm.

23. A liquid crystal device as claimed in claim 1 wherein the means of applying a plurality of voltages to the liquid crystal layer comprises a layer of electrically conductive, and substantially optically transparent, material applied to the internal surface of both cell walls.

24. A liquid crystal device as claimed in claim 15 wherein the layers of electrically conductive material are applied to the internal surface of both cell walls and are patterned so as to produce an array of addressable pixels.

25. A liquid crystal display comprising the liquid crystal device as claimed in claim 1 and further comprising a means for optically distinguishing between at least two of the stable liquid crystal configurations adopted.

26. A liquid crystal display as claimed in claim 25 wherein the means for optically distinguishing between at least two of the liquid crystal configurations adopted comprises a pair of polarisers placed one either side of the liquid crystal device with their respective optic axes aligned with respect to the liquid crystal device such that the amount of light transmitted through the liquid crystal display will differ depending on which liquid crystal configuration is adopted.

27. A liquid crystal display as claimed in claim 25 wherein the means for optically distinguishing between at least two of the liquid crystal configurations adopted comprises a optically reflective layer placed one side of the liquid crystal device and a polariser placed the other side of the liquid crystal device with its optic axis aligned with respect to the liquid crystal device such that the amount of light reflected by the device will differ depending on which liquid crystal configuration is adopted.

28. A liquid crystal display as claimed in claim 25 wherein the means for optically distinguishing between at least two of the liquid crystal configurations adopted comprises a dichrioc dye, the dye being added to the liquid crystal such that the amount of light absorbed by the liquid crystal display will differ depending on which liquid crystal configuration is adopted.

29. A bistable liquid crystal device comprising a layer of liquid crystal material located between two cell walls, a means of applying a voltage to the liquid crystal layer and a surface alignment grating on the internal surface of at least one cell wall wherein the surface profile of the surface alignment grating comprises three or more defect sites per grating period with at least one +½ defect site per grating period and at least one −½ defect site per grating period wherein one pair of +½ and −½ defect sites are situated so as to impart low surface pretilt in the azimuthal plane to one defect state wherein such low pretilt state is of a significantly lower energy than that of any of the other possible defect states wherein only the non-defect state and the defect state of low pretilt can be readily selected on application of a voltage.

* * * * *